(12) United States Patent
Lieder et al.

(10) Patent No.: US 10,020,958 B2
(45) Date of Patent: Jul. 10, 2018

(54) CAN FD

(71) Applicant: Renesas Electronics Europe GmbH, Duesseldorf (DE)

(72) Inventors: Roland Lieder, Duesseldorf (DE); Klaus Turski, Duesseldorf (DE)

(73) Assignee: RENESAS ELECTRONICS EUROPE GMBH, Dusseldorf (DE)

( * ) Notice: Subject to any disclaimer, the term of this patent is extended or adjusted under 35 U.S.C. 154(b) by 126 days.

(21) Appl. No.: 14/888,256

(22) PCT Filed: Mar. 31, 2014

(86) PCT No.: PCT/EP2014/056414
§ 371 (c)(1),
(2) Date: Oct. 30, 2015

(87) PCT Pub. No.: WO2014/177330
PCT Pub. Date: Nov. 6, 2014

(65) Prior Publication Data
US 2016/0080168 A1    Mar. 17, 2016

(30) Foreign Application Priority Data

May 1, 2013   (EP) .................................... 13166142

(51) Int. Cl.
*H04L 12/40*   (2006.01)
*H04L 12/46*   (2006.01)
(Continued)

(52) U.S. Cl.
CPC ...... *H04L 12/40032* (2013.01); *H04L 1/0002* (2013.01); *H04L 12/4013* (2013.01);
(Continued)

(58) Field of Classification Search
CPC ............. H04L 12/40032; H04L 1/0002; H04L 12/4013
See application file for complete search history.

(56) References Cited

U.S. PATENT DOCUMENTS

2004/0141513 A1   7/2004  Takechi et al.
2005/0063416 A1*  3/2005  Shin ....................... H04L 69/32
                                                                370/465
(Continued)

FOREIGN PATENT DOCUMENTS

DE   10 2011 080476 A1   2/2013
JP      2004-221745       8/2004
(Continued)

OTHER PUBLICATIONS

Notification of Transmittal of the International Search Report and the Written Opinion of the International Searching Authority, or the Declaration for International Application No. PCT/EP2014/056414 (dated Jun. 27, 2014).
(Continued)

*Primary Examiner* — Siming Liu
(74) *Attorney, Agent, or Firm* — Jenkins, Wilson, Taylor & Hunt, P.A.

(57) ABSTRACT

A device for allowing a CAN 2.0B controller to participate passively in CAN FD communication is described. The device is configured to identify whether a frame on RXD is a CAN FD frame and, in dependence upon identifying that the frame is a CAN FD frame, to replace a section of the CAN FD frame, including the data phase of the CAN FD frame, with substitute data having a format which complies with CAN 2.0B. The device may be included in a CAN transceiver.

15 Claims, 19 Drawing Sheets

(51) Int. Cl.
   *H04L 29/06* (2006.01)
   *H04L 1/00* (2006.01)
(52) U.S. Cl.
   CPC .......... *H04L 12/4625* (2013.01); *H04L 69/08* (2013.01); *H04L 2012/40215* (2013.01)

(56) References Cited

U.S. PATENT DOCUMENTS

| | | | |
|---|---|---|---|
| 2006/0130049 A1 | 6/2006 | Eimers-Klose et al. | |
| 2014/0215109 A1* | 7/2014 | Hopfner | G06F 13/36 710/105 |

FOREIGN PATENT DOCUMENTS

| | | |
|---|---|---|
| JP | 2006-506862 | 2/2006 |
| WO | WO 2004/047385 A2 | 6/2004 |
| WO | WO 2012/146631 A1 | 11/2012 |
| WO | WO 2012/150248 A1 | 11/2012 |
| WO | WO 2013/020781 A1 | 2/2013 |

OTHER PUBLICATIONS

Extended European Search Report for European Patent Application No. 13166142.3 (dated Nov. 12, 2013).
Pradeep, "CAN-FD and Ethernet Create Fast Relieable Automotive Data Basues for the Next Decade," Atmel—Automotive Compliation, pp. 36-43 (Apr. 2013).
CAN with Flexible Data-Rate, Specification Version 1.0, Bosch, pp. 1-34, (released Apr. 17, 2012).
"Road vehicles—Controller area network (CAN)—Part 1: Data link layer and physical signalling," First edition International Standard ISO 11898-1:2003, pp. 1-52 (Dec. 1, 2003) with Technical Corrigendum ISO 11898-1:2003/Cor.1:2006, pp. 53-58 (May 15, 2006).
CAN Specification, Version 2.0, Bosch, pp. 1-72, (1991).
Office Action for Japanese Patent Application Serial No. JP 2016-510973 (dated Mar. 6, 2018).

* cited by examiner

CAN FD

FIELD OF THE INVENTION

The present invention relates to controller area network flexible data rate (CAN FD).

BACKGROUND

Controller area network (CAN) is a serial communications protocol which was originally designed for use in automotive applications, but which has now been adopted in a wide variety of other fields including heating, ventilation and air conditioning (HVAC) control systems, process control systems and medical equipment. CAN mainly concerns the requirements of physical and data link layers and has been declared an international standard, namely ISO 11898.

CAN is a message-based, asynchronous, multi-master, broadcast communication system. A CAN network comprises two or more nodes connected to a CAN bus line which is typically provided by a twisted pair of wires. Any node connected to a CAN bus is free to try to transmit a message to other nodes when the CAN bus is free. Each message is assigned a unique identifier which is used to identify the content of the message and to prioritise and filter messages. If two or more nodes start transmitting messages at the same time, then bus access conflict is resolved through a process of arbitration using the identifier and bit-wise comparison of CAN bus states, namely "dominant" and "recessive" levels corresponding to logical '0' and '1' states respectively. When two nodes try to transmit dominant and recessive bits at the same, the dominant bit takes precedence and the dominant value (i.e. '0') appears on the CAN bus. Nodes monitor the CAN bus and so when a node tries to transmit a recessive bit and the CAN bus adopts a dominant value, then the node is able to identify a collision and interrupt transmission, leaving the node that transmitted the dominant bit to continue transmission on the CAN bus.

CAN specifies two frame formats, namely a standard or base frame format (which is compatible with part A or B of the CAN 2.0 protocol) and an extended frame format (which is compatible with part B of the CAN 2.0 protocol). A frame arranged in the standard or base frame format has an 11-bit identifier, whereas a frame arranged in the extended frame format has a two-part identifier made up of an 11-bit base identifier and an 18-bit extension.

CAN specifies four types of frame, namely a data frame for carrying data, a remote frame for requesting transmission of a data frame, an error frame for reporting detection of an error and an overload frame for providing a delay between frames.

Further details of CAN and CAN frame formats can be found in the CAN Specification, version 2.0 (1991) and ISO 11898-1.

CAN buses can transmit data at bit rates of up to 1 Mbit/s and data frames can carry a payload of up to 8 bytes. However, to support higher data rates and larger payloads, a new protocol, CAN with Flexible Data Rate (CAN FD), has been proposed as set out in CAN with Flexible Data-Rate, Specification, version 1.0 (2012).

FIG. 1 shows a CAN FD data frame.

Referring to FIG. 1, a CAN FD data frame is separated from a preceding frame (not shown) by an interframe space (IFS) and is followed by another interframe space or an overload frame.

The CAN FD data frame includes a start of frame (SOF) field, an arbitration field, a control field, a data field, a cyclical redundancy code (CRC) field, an acknowledge (ACK) field and an end of frame (EOF) field.

In a so-called "arbitration phase", IFS preceding a CAN FD frame and a first portion of the CAN FD frame is transmitted at a standard bit rate (i.e. a CAN bit rate, e.g. 500 kbits$^{-1}$). In a so-called "data phase", a second portion of the CAN FD frame can be transmitted at either a standard bit rate or a high bit rate (for example, up to 8 times the CAN bit rate). In another arbitration phase, a third portion of the CAN FD data frame and IFS or overload frame following the CAN FD data frame is transmitted at a standard bit rate.

CAN FD specifies four frame formats, namely CAN standard and CAN extended formats (corresponding to the standard and extended formats specified in ISO 11898-1), CAN FD standard and CAN FD extended formats.

FIG. 2 shows a CAN FD data frame in CAN FD standard (or "base") format.

Referring to FIG. 2, the arbitration field includes a base identifier followed by a reserve bit (r1). The control field consists of an identifier extension (IDE) bit, an extended data length (EDL) bit, a reserve bit (r0), a bit rate switch (BRS) bit, an error state indicator (ESI) flag and a data length code (DLC). The EDL bit is also referred to as the Flexible Data Format (FDF) bit. The CRC field includes a CRC sequence and a CRC delimiter. The ACK field comprises an ACK slot and ACK delimiter.

The CAN FD extended format includes an arbitration field which consists of the base identifier, a substitute remote request (SRS) bit, the IDE bit, the identifier extension, and reserve bit (r1) and a control field which consists of the EDL bit (which may be referred to as the FDF bit), reserve bit (r0), the BRS bit, the ESI flag and the DLC.

All CAN FD frames formats include a CRC field comprising a CRC sequence and CRC delimiter. However, the length of the CRC sequence differs for different frame formats, namely 15 bits for CAN base and CAN extended frame formats, 17 bits for CAN FD frames which contain up to 16 bytes and 21 bits for CAN FD frames which contain more than 16 bytes.

The BRS bit marks a transition from the arbitration phase to the data phase. The CRC delimiter in a CAN FD frame signals a transition back to the arbitration phase.

Although the CAN FD protocol is based on part B of the CAN protocol (herein referred to simply as "CAN 2.0B"), it has limited backward compatibility with the CAN 2.0B protocol. A CAN FD node is able to receive and transmit CAN messages according to ISO 11898-1. However, a CAN node which can send and receive messages according to CAN 2.0B protocol (herein referred to as a "CAN 2.0B node") cannot identify CAN FD messages and so, on receipt of a CAN FD message, will respond with a CAN error message.

This can hinder implementation of a CAN system comprising a mixture of nodes which comply with CAN 2.0B but not CAN FD and nodes which comply with CAN FD.

One solution is to use partial networking whereby nodes can be selectively powered down, placed in sleep mode or kept in standby. However, this still means that CAN 2.0B and CAN FD nodes cannot directly communicate.

SUMMARY

According to a first aspect of the present invention there is provided a device configured to identify whether a frame on RXD is a CAN FD frame and, in dependence upon identifying that the frame is a CAN FD frame, to replace a section of the CAN FD frame including the data phase of the CAN FD frame with substitute data having a format which complies with CAN 2.0B.

Thus, the device can be placed between CAN bus physical layer circuitry and a local CAN controller and remove sections of a CAN FD frame which would otherwise generate errors at the CAN controller. A CAN substitute frame which includes the substitute data is output on a new or output RXD (CRXD) to the CAN controller. The CAN substitute frame may include the beginning of the CAN FD frame. The CAN substitute frame may include additional data.

The section may be continuous.

The device may comprise first circuitry (for example a first module) for identifying whether the frame on RXD is a CAN FD frame.

The first circuitry may include a first functional block configured to identify the start of a frame. The first functional block may be configured to identify the start of the frame by identifying a pattern of bits. The pattern of bits may include EOF, IFS and SOF. The first functional block may be configured, in response to identifying the start of a frame, to output a start of the frame synchronisation signal (SOF-SYNC).

The first circuitry may include a second functional block configured to identify error frame(s) and/or overload frame(s) in RXD in the arbitration phase. The second functional block may be configured, in response to detecting an error frame or overload frame, to output a first error signal (AERR).

The first circuitry may include a third functional block configured to identify error frame(s) and/or overload frame(s) in RXD in the data phase. The third functional block may be configured, in response to detecting an error frame or overload frame, to output a second error signal (DERR).

The first circuitry may include a fourth functional block.

The fourth functional block or another functional block may be configured to identify the IDE bit. The fourth functional block may be configured, in response to identifying the IDE bit, to output a signal (IDE-RTR) indicating the presence of the IDE bit.

The fourth functional block or another functional block may be configured to identify the EDL bit (which may be referred to as the FDF bit). The fourth functional block may be configured, in response to identifying the EDL bit, to output a signal indicating whether the EDL bit is set.

The fourth functional block or another functional block may be configured to identify the BRS bit. The fourth functional block may be configured, in response to identifying the BRS bit, to output a signal indicating whether the BRS bit is set.

The first circuitry may include a fifth functional block.

The fifth functional block may operate in first and second modes of operation.

The fourth functional block may be configured, in response to the EDL bit (which may be referred to as the FDF bit) being set, to output a signal for controlling masking of the CAN FD frame.

The fourth functional block may be configured, in response to given precondition, to output a signal (END-GEN) for controlling generation of substitute data.

The device may comprise second circuitry (for example a second module) for replacing the section of the CAN FD frame including the data phase with substitute data having a format which complies with the CAN protocol.

The second circuitry may include a set of at least one or at least two generators for generating substitute data. The second circuitry may include a multiplexer coupled to RXD and to the generator(s) and to output a multiplexed signal.

The section may start with the EDL bit (which may be referred to as the FDF bit). The section may end with the CRC delimiter.

More than one CAN substitute frames may be used to replace the CAN FD frame section.

The device may be configured to replace data following the section with further substitute data having a format which complies with CAN 2.0B. The section and data may be contiguous.

The substitute data may include DLC. The DLC may specify that the frame contains no data.

The device may be configured to add additional substitute data after the substitute data. For example, this can be used when the CAN FD frame is longer than a CAN substitute frame.

The device may be configured to add additional data after the substitute data (i.e. to replace another subsequent section of the CAN FD frame with additional data).

In a first mode, the additional data may comprise an error frame and an error delimiter. The device may configured to identify a point given number of bits before the end of the CAN FD frame and to add the error frame and error delimiter such that the error delimiter ends when the CAN FD frame ends.

This can be used to minimise the time that a local CAN controller is prevented from accessing the CAN bus.

In a second mode, the additional data may comprise at least overload frame and corresponding overload delimiter.

This can used to help minimise the number of errors generated at a local CAN controller.

The device may be configured to identify whether the frame is a CAN FD frame by identifying the EDL bit (which may be referred to as the FDF bit). The device may identify the EDL bit by inspecting a bit at a position where it would expect to find the EDL bit in a CAN FD frame and to determine whether the bit is recessive.

The device may be configured to identify whether the frame has a base format or an extended format. The device may be configured to inspect the IDE bit to identify whether the frame has a base format or an extended format.

The device may be configured to detect a first bit (IDE) which precedes the section and to generate a first signal (IDE-RTR) to provide a marker for the first bit.

The device may be configured to use the first signal to locate the start of the section.

The device may be configured, in response to receiving a CAN frame from a local CAN controller, to suppress transmission of the CAN frame in dependence upon whether the substitute data is being generated.

The device may be implemented in hardware logic.

According to a second aspect of the present invention there is provided a CAN transceiver comprising the device and a CAN bus physical layer device circuitry (PHY) comprising an RXD output and an TXD input. The device is arranged to receive RXD from the CAN bus physical layer device circuitry and to provide TXD to the CAN bus physical layer device circuitry.

According to a third aspect of the present invention there is provided a node (a "CAN 2.0B node") comprising a CAN 2.0B controller and the CAN transceiver coupled to the CAN 2.0B controller.

Thus, using a CAN transceiver which include the converter can enable the CAN 2.0B controller to participate passively in CAN FD communication.

According to a fourth aspect of the present invention there is provided a CAN system comprising a CAN bus, at least one CAN 2.0B node and at least one CAN FD node.

According to a fifth aspect of the present invention there is provided a method comprising identifying whether a frame on RXD is a CAN FD frame and, in dependence upon identifying that the frame is a CAN FD frame, replacing a section of the CAN FD frame including the data phase of the CAN FD frame with substitute data having a format which complies with CAN 2.0B.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Controller Area Network 1

Figure 3:
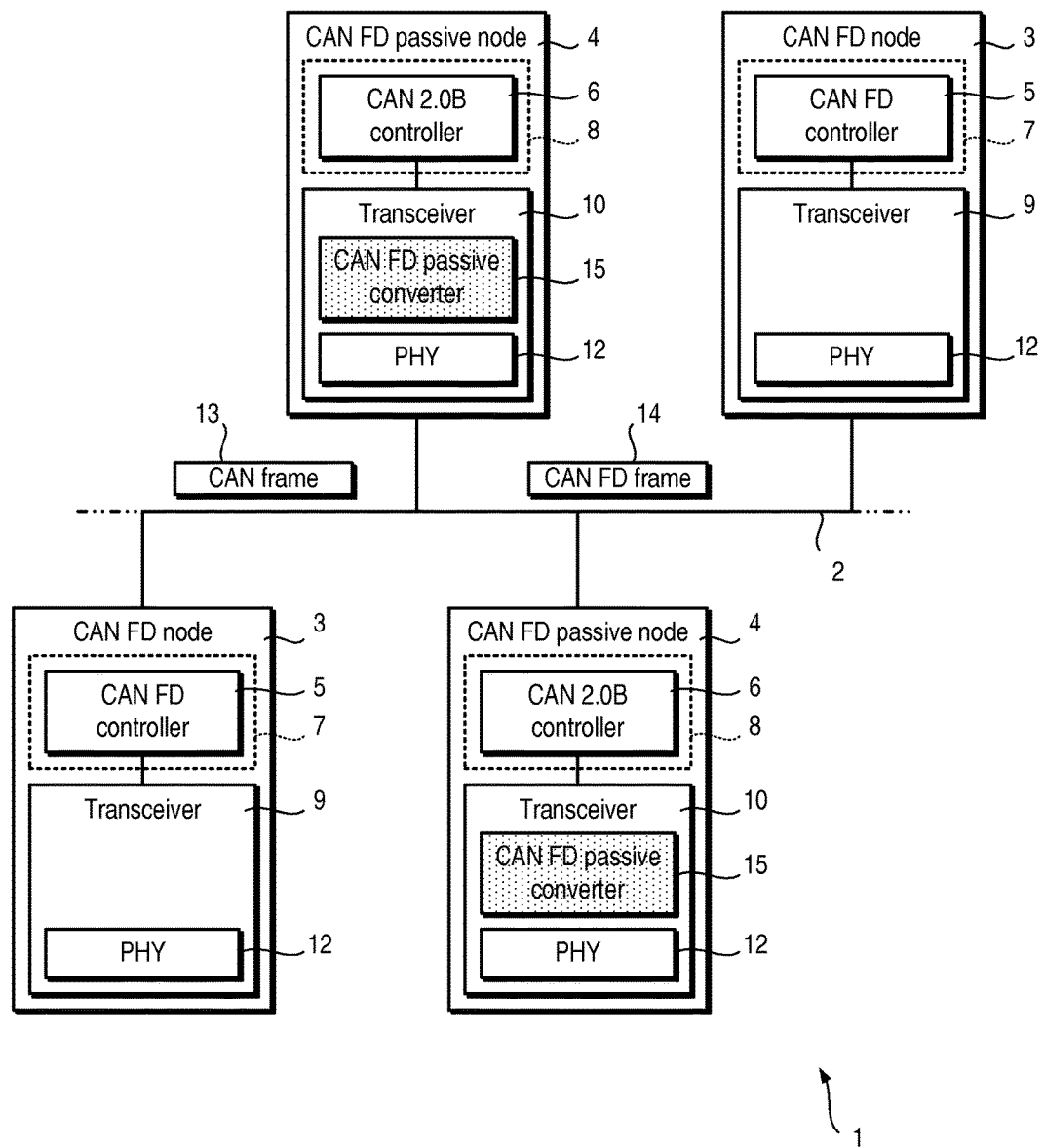
FIG. 3 is a schematic block diagram of a CAN network including CAN FD nodes and CAN FD passive nodes.

Referring to FIG. 3, a controller area network (CAN) 1 is shown. The CAN 1 includes a CAN bus 2 and a plurality of nodes 3, 4 connected to the CAN bus 2. Each node 3, 4 includes a controller 5, 6 which may be embedded in a microcontroller 7, 8 or implemented as a stand-alone device, and a transceiver 9, 10. The transceivers 9, 10 each include circuitry 11, 12 for implementing physical layer requirements of ISO 11898 (2004). The nodes 3, 4 are able to send and receive frames 13 which comply with CAN 2.0B, i.e. ISO 11898-1 (2004). Herein, such frames 13 are referred to as "CAN frames".

Each node 3 of a first type (herein referred to as "CAN FD nodes") includes a controller 5 which complies with the CAN Flexible Data Rate (CAN FD) protocol and, thus, is able to send and receive CAN FD frames 14 (herein also referred to as "FD frames").

Each node 4 of a second type (herein referred to as "CAN FD passive nodes" or "CAN FD tolerant nodes") includes a controller 6 which complies with the CAN 2.0B protocol and thus is able to exchange CAN frames 13. The transceiver 10 includes or is provided with a CAN FD/CAN FD passive converter 15 which enables the CAN FD passive node 4 to be connected to the CAN bus 2 without disturbing CAN FD communication by, for example, generating error frames (not shown) when receiving a CAN FD frame 14.

CAN FD communication can support a CAN FD arbitration rate, for example of up to 500 kbits$^{-1}$ or up to 1 Mbits$^{-1}$, which is typically limited by the processing speed of the controller 5, 6 and a CAN FD data rate, for example of up to 4 Mbits$^{-1}$ or 8 Mbits$^{-1}$ (i.e. up to 8 times the arbitration rate), which is typically constrained by the physical limits of the CAN bus 2.

The CAN FD passive node(s) 4 can, among other things, provide or allow selective wakeup as specified by ISO 11898-6, be tolerant of CAN FD messages, allow "classic" wakeup by dominant edge signalling, provide bus protection by transmit ("TX") low detection and/or operation modes including transparent (active), sleep and selective wakeup (using CAN 2.0B messages).

The CAN FD passive node(s) 4 skip phases of communication which are specific to CAN FD communication thereby allowing it (them) to participate in mixed CAN FD and CAN 2.0B communication. In particular, a CAN FD passive node 4 can participate passively in CAN FD communication and actively in CAN 2.0B communication.

CAN FD Frame to CAN Substitute Frame Conversion

Figure 4:
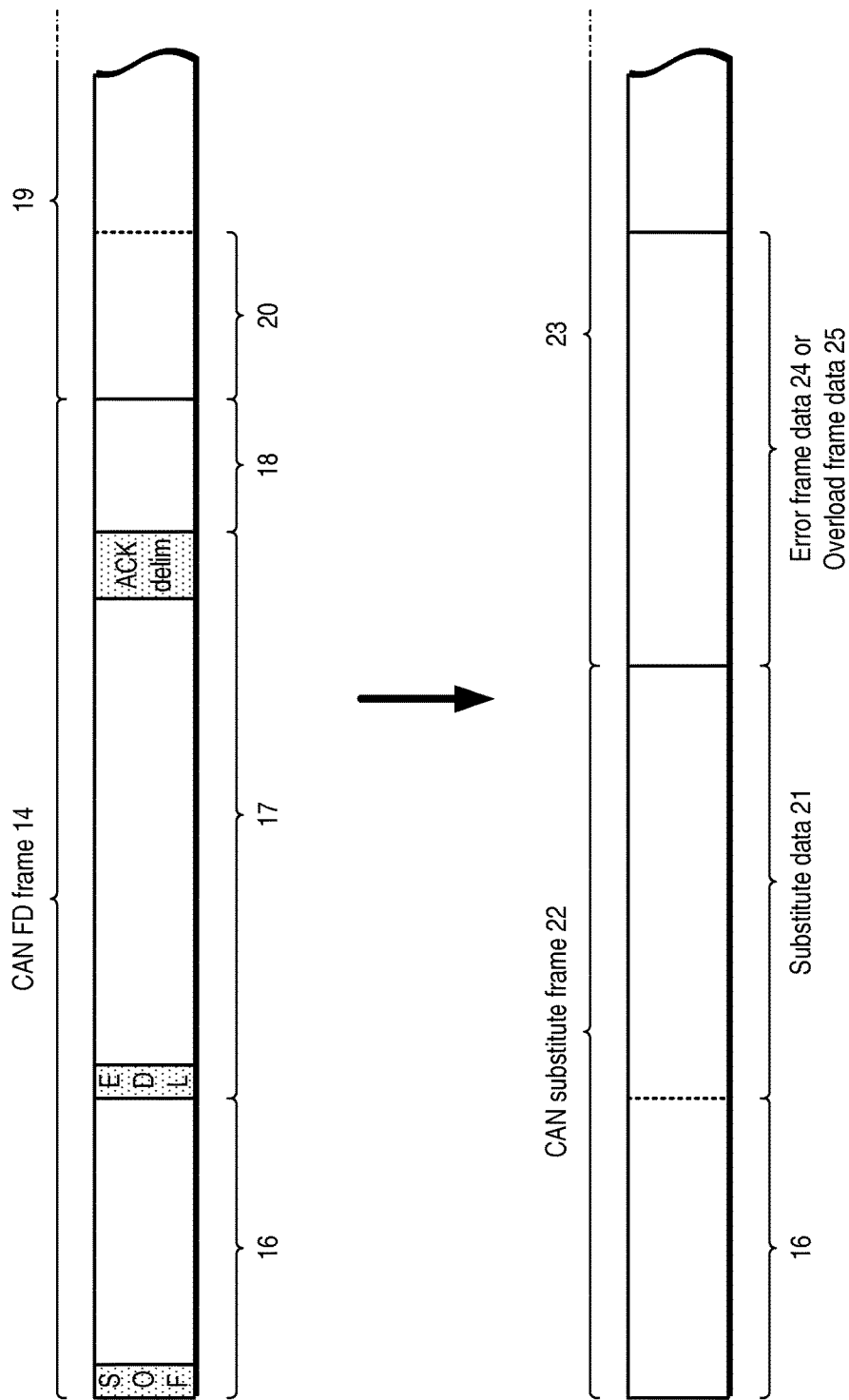
FIG. 4 illustrates conversion of a CAN FD frame into a CAN frame.

Referring also to FIG. 4, a CAN FD frame 14 generally comprises a first section 16 which complies with both CAN 2.0B and CAN FD protocols, a second section 17 which is specific to the CAN FD protocol and a third section 18 which may comply with both CAN 2.0B and CAN FD protocols or just the CAN FD protocol. The CAN FD frame 14 is followed by other data 19 (herein referred to as "following data") typically in the form of IFS followed by another frame, which may be a CAN 2.0B frame or a CAN FD frame, and which may comprise a data frame or other type of frame.

The first section 16 of the CAN FD frame 14 starts with a SOF bit. The second section 17 starts with an EDL bit (which may also be referred to as the "FDF bit") and finishes with the ACK delimiter. The content of the first and second sections 16, 17 depends on frame format.

When receiving a CAN FD frame 14, the CAN FD/CAN FD passive converter 15 can process the CAN FD frame 14 by replacing the second and third sections 17, 18 of the frame 14 and a part 20 of the following data 19 with substitute data 21 to form a frame 22 which complies with CAN 2.0B (herein referred to as a "CAN substitute frame", "generated CAN frame" or "CAN 2.0 compliant frame"). The CAN substitute frame 22 is followed by additional data 23 including error frame data 24 or overload frame data 25. In some circumstances, for example when a CAN FD 14 is long, a CAN substitute frame 22 may be followed by one or more further CAN substitute frames 22 before the error frame data 24 or overload frame data 25. Furthermore, a CAN substitute frame 22 need not necessarily include the beginning of the CAN FD frame 14, i.e. the first section 16.

As will be explained in more detail hereinafter, the content of the substitute data 21 and, thus, the substitute CAN frame(s) 22, depend on frame format and frame length. The substitute data 21 typically include a dominant reserved bit r0 and DLC bits and may be followed by an empty data section, CRC bits, ACK bits, EOF bits, IFS bits, SOF bits and/or arbitration field bits.

When a CAN 2.0B node 4 transmits a CAN frame 13, the CAN/CAN passive converter 15 can delay transmission of the CAN frame 13 until a CAN FD frame 14 has passed by generating dedicated bus activity sequences which is forwarded to the local controller 6.

As will also be explained in more detail hereinafter, different operational modes may be provided including a first mode which helps to maximise bus participation and a second mode which helps to minimise the number of errors at the local controller 6.

Transceiver 10

Figure 5:
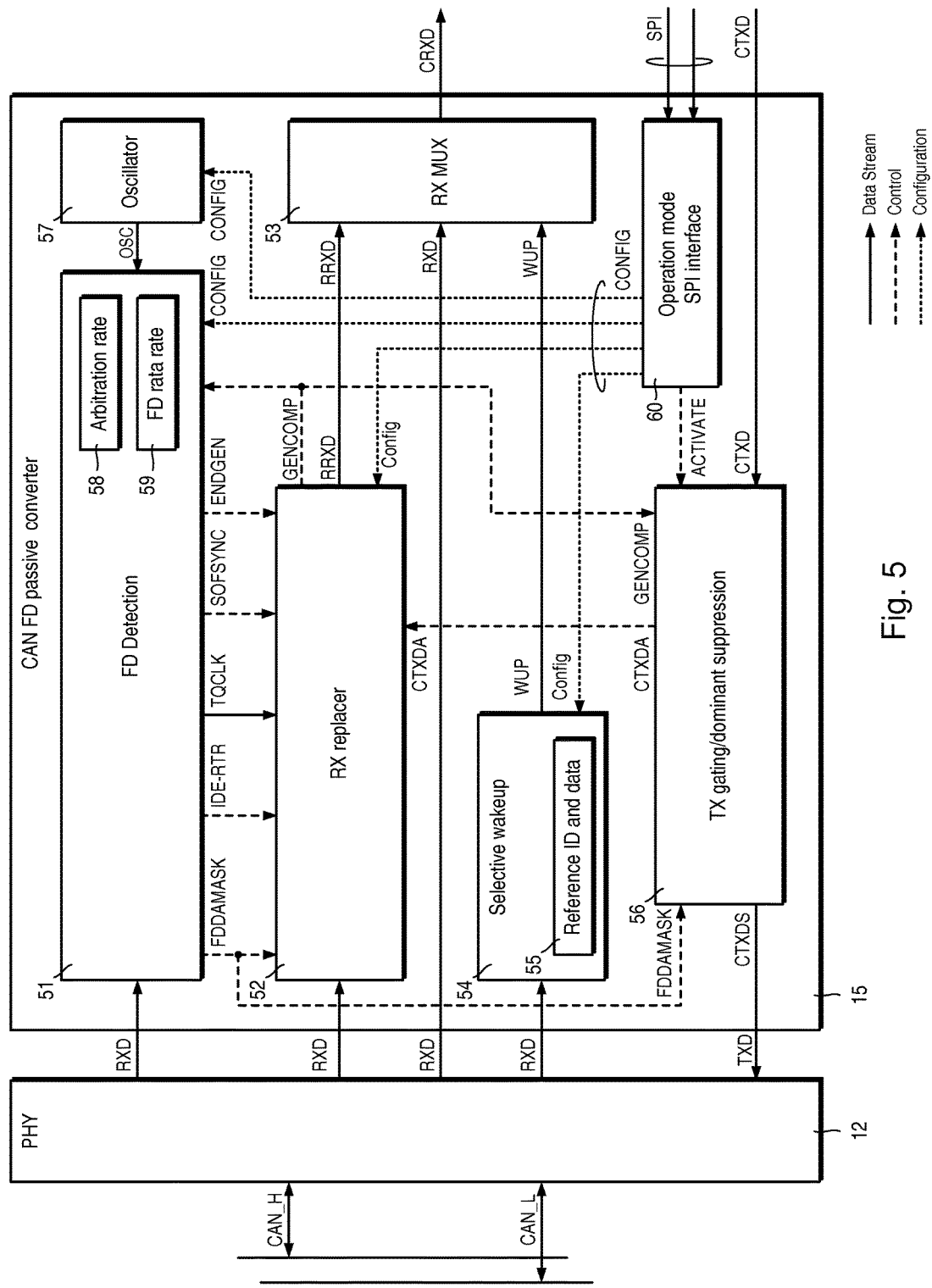
FIG. 5 is a schematic block diagram of a transceiver which includes a CAN FD/CAN FD passive converter.

Referring to FIG. 5, a transceiver 10 comprising the physical layer circuitry (PHY) 12 and the CAN FD/CAN FD passive converter 15 is shown in more detail. Data streams and clock signals are shown as continuous lines, control signals are shown as long dashed lines and configuration signals are shown as short dashed lines.

As shown in FIG. 5, the PHY 12 is coupled to CAN high (CAN_H) and CAN low (CAN_L) lines. The PHY 12 outputs a CAN receive data signal (RXD) and receives a CAN transmit data signal (TXD) from the CAN FD/CAN FD passive converter 15.

RXD is supplied to a CAN FD detection unit 51 (herein simply referred to as the "FD detection unit"), a receive signal (RX) replacer unit 52, an RX multiplexer unit 53 and a selective wake-up unit 54 which includes a reference ID and data registers 55.

TXD is supplied to PHY 12 in the form of a transmitter data input signal (CTXDS) from a TX gating and dominant suppression unit 56.

The FD detection unit 51 receives a clock signal (OSC) from oscillator 57. The oscillator 57 may operate at 8 or 16 MHz, or at another frequency. The FD detection unit 51 also receives a set control signal (GENCOMP) from the RX replacer 52 and supplies an end-of-EDL-bit indicator signal (IDE-RTR), a CAN FD data mask signal (FDDAMASK), a CAN bitrate signal (TQCLK), a start of frame synchronisation signal (SOFSYNC) and a frame generation signal (ENDGEN) to the RX replacer 52. The FD detection unit 51 also supplies FDDAMASK to the TX gating and dominant suppression unit 56.

The FD detection unit 51 includes arbitration bit rate and CAN FD bit rate registers 58, 59 which are set using configuration signals (CONFIG) received from Serial Peripheral Interface (SPI) unit 60 which is controlled using SPI signals from the local CAN controller 6 (FIG. 3).

The RX replacer 52 is configured using a configuration signal (CONFIG) received from the SPI interface unit 60. The RX replacer 52 outputs a substitute receive data signal (RRXD) which includes replacement data 21 (FIG. 4) to the RX multiplexer unit 53.

The selective wake up unit 54 is configured using a configuration signal (CONFIG) received from the SPI interface unit 60. The selective wake-up unit 54 outputs a wake-up signal (WUP) to the RX multiplexer unit 53.

The RX multiplexer unit 53 outputs a CAN receive data signal (CRXD) to the local CAN controller 6 (FIG. 3).

The TX gating and dominant suppression unit 56 receives FDDAMASK from the FD detection unit 51 and GENCOMP from the RX replacer unit 52. The TX gating and dominant suppression unit 56 also receives CAN transmit data (CTXD) from the local CAN controller 6 (FIG. 3) and an activate control signal (ACTIVATE) from the SPI interface unit 60. The TX gating and dominant suppression unit 56 outputs a CAN transmit data inverted signal (CTXDA) to the RX replacer unit 52.

CAN FD/CAN FD Passive Converter Operation

Referring to FIGS. 4 and 5, the CAN FD/CAN FD passive converter 15 can operate in different modes.

In a first mode, the CAN FD/CAN FD passive converter 15 can operate in a way which optimises bus performance.

As a CAN FD frame 14 is received, the FD detection unit 51 marks the second and third sections 17, 18 of the frame 14 and the section 19 of data following the frame for replacement. The RX replacer 52 processes the CAN FD frame 14 which is replaced and fed into the RX multiplexer 53 and output as CRXD.

Figure 1:
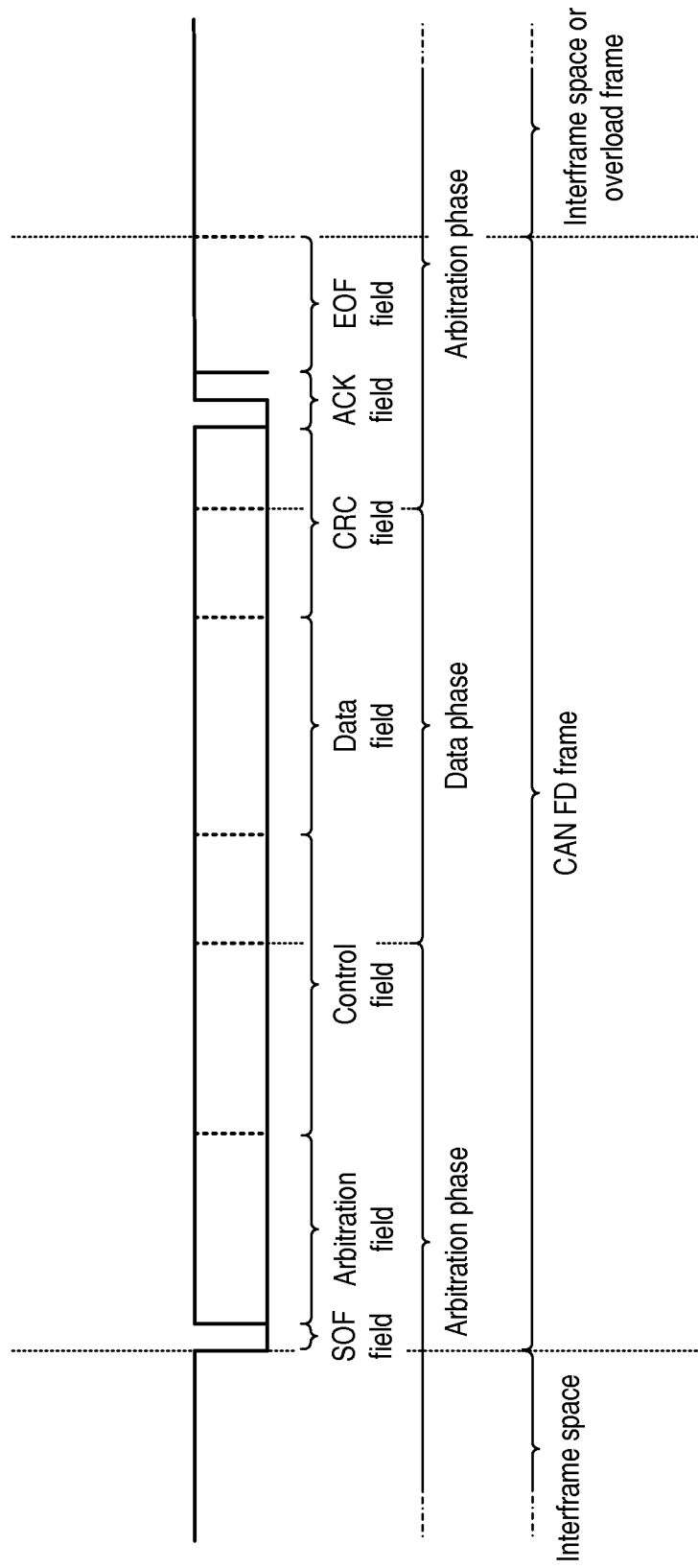
FIG. 1 illustrates a CAN FD frame.
Figure 2:
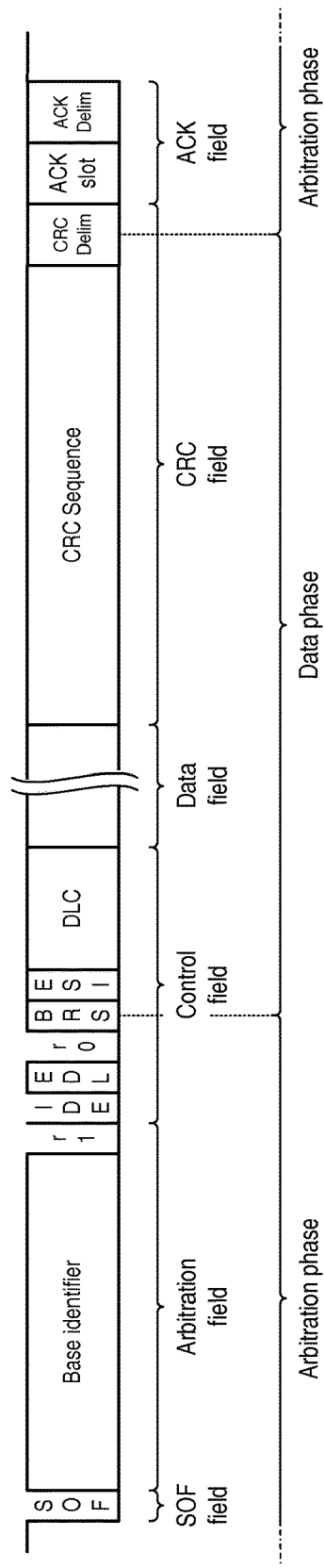
FIG. 2 illustrates a CAN FD extended format data frame.

While CTXD is inactive (i.e. recessive), the RX replacer 52 completes a so-far incomplete CRXD frame, i.e. the first section 16 of the frame 14, by replacing the rest of the frame, i.e. the second and third sections 17, 18 of the frame, and a part of IFS, i.e. following data 20, by adding substitute data 21 to form a CAN 2.0B-compliant frame 22. The substitute data 21 is appended after the IDE bit (FIG. 2) and includes CRC and positive ACK.

If CTXD becomes active (i.e. dominant) while the CAN FD frame 14 is still being processed, the TX gating and dominant suppression unit 56 suppresses transmission of CTXD to the PHY 12. The TX gating and dominant suppression unit 56 feeds back CTXD in the form of CTXDA to the RX replacer 52 which is triggered by CTXD. Consequently, the RX replacer 52 generates a CAN 2.0B-compliant frame 22 including an arbitration field. During this arbitration field, the frame on CTXD is overwritten by dominant level. This intentionally results in loss of arbitration for the local CAN controller 6 (FIG. 3) thereby causing it to stop transmission.

The CAN-compliant frame 22 is arranged to be of minimum length (i.e. DLC=0) with no data content and is configured to have highest priority in the arbitration field. If the distance to the end of the CAN FD frame 14 is such that it matches with the length of an error frame data 24 (i.e. error frame and error delimiter), generation and output of frames to CRXD is aborted if CRXD is still active and an error frame is sent. Thus, the local CAN controller 6 (FIG. 3) may regain access to the CAN bus as soon as the CAN FD frame 14 has ended.

Whenever a CAN FD frame 14 is processed in this way, a RX error counter (not shown) in the local CAN controller 6 (FIG. 3) is incremented. Thus, in this mode of operation, the local CAN controller 6 (FIG. 3) may reach an "error passive" state.

The timing of the generated error frame is set such that the end of error frame matches the beginning of IFS of the CAN FD bus.

In a second operation mode, the CAN FD/CAN FD passive converter 15 can operate in a way which minimises RX errors, but on the other hand does not allow the local CAN controller 6 to re-join CAN bus communication at a precise point, i.e. the start of IFS.

Like in the first operation mode, when a CAN FD frame 14 is received, the FD detection unit 51 marks the second and third sections 17, 18 of the frame 14 and the section 20 of data following the CAN FD frame 14 for replacement and the RX replacer 52 adds substitute data 21.

However, to avoid CTXD becoming dominant while the CAN FD frame 14 is still being processed, overload frames are generated until the CAN FD frame 14 has ended. During overload frames, the local CAN controller 6 (FIG. 3) is unable to start any transmission and so it waits until transmission of overload frames has finished.

If another CAN FD frame 14 starts on the CAN bus during the frame completion or during overload frame generation, further overload frames are generated until the end of the overload frame delimiter matches a bus idle state.

Like in the first mode, the CAN 2.0-compliant frame 22 is arranged to be of minimum length (i.e. DLC=0).

If the CAN bus load is 100%, then the local CAN controller 6 (FIG. 3) is not able to participate in the arbitration unless the end of the internal frame generation or overload delimiter matches an interframe space phase of the CAN bus. However, typically, CAN bus load tends to be no more than 50%. Thus, on average, after a reasonable time, the CAN controller 6 (FIG. 3) can usually reconnect to the CAN bus when the end of the internal frame generation or the overload frame delimiter falls within the bus idle or interframe space phase.

FD Detection Unit 51

Figure 6:
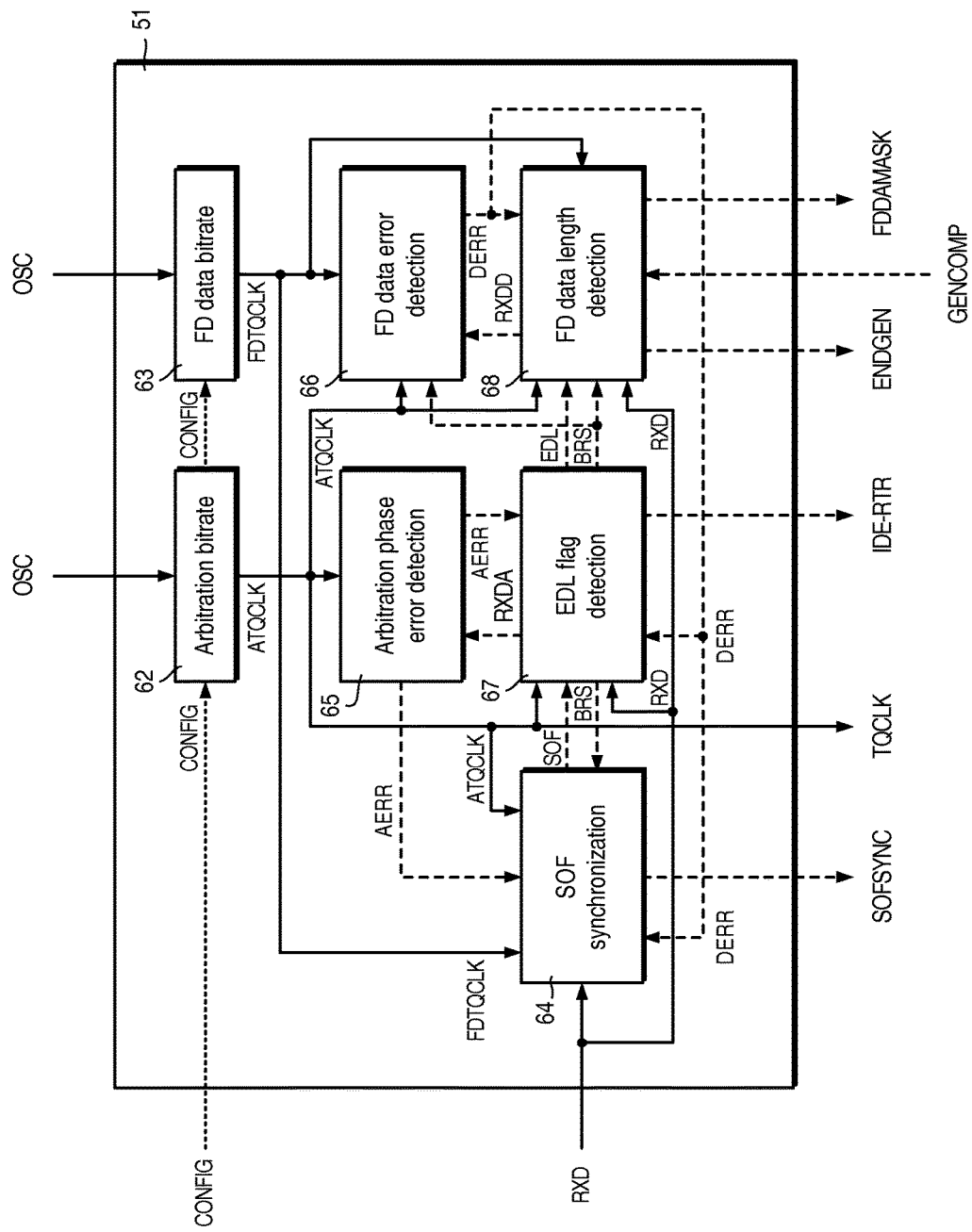
FIG. 6 is a schematic block diagram a CAN FD detection unit which includes an SOF synchronisation unit, an arbitration phase error detection unit, an FD data phase error detection unit, an EDL flag detection unit and an FD data length detection unit.

Referring to FIG. 6, the FD detection unit 51 is shown in more detail.

The FD detection unit 51 includes a CAN arbitration bitrate time quanta clock generation unit 62, a CAN FD data bitrate time quanta clock generation unit 63, an SOF synchronisation unit 64, an arbitration phase error detection unit 65, a CAN FD data error detection unit 66, an EDL flag detection unit 67 and a CAN FD data length detection unit 68.

As shown in FIG. 6, the FD detection unit 51 uses a clock signal OSC from an internal oscillator 57 (FIG. 5). OSC may be 8 or 16 MHz. A precision of 1.25% is sufficient, i.e. 1 time quanta ("TQ") error within 10 bits using 8 TQ per bit. CAN arbitration bitrate time quanta clock (ATQCLK) and CAN data bitrate time quanta clock (FDTQCLK) can be generated with a lower TQ per bit resolution.

ATQCLK is set via the SPI interface 60 (FIG. 5) using CONFIG and is generated by the arbitration bitrate time quanta clock generation unit 62. ATQCLK is used during the arbitration phases of RXD. The arbitration bitrate time quanta clock generation unit 62 generates the bit timing clock based on 8 TQ per bit. ATQCLK is forwarded to the RX replacer 52 (FIG. 5) as TQCLK.

FDTQCLK is set via the SPI interface 60 (FIG. 5) using CONFIG and is output by CAN FD data bitrate unit 63. FDTQCLK is used during data phases of RXD when a higher bitrate is required. The CAN FD data bitrate time quanta clock generation unit 63 generates the bit timing clock based on 4 TQ per bit.

SOF Synchronization Unit 64

Figure 7:
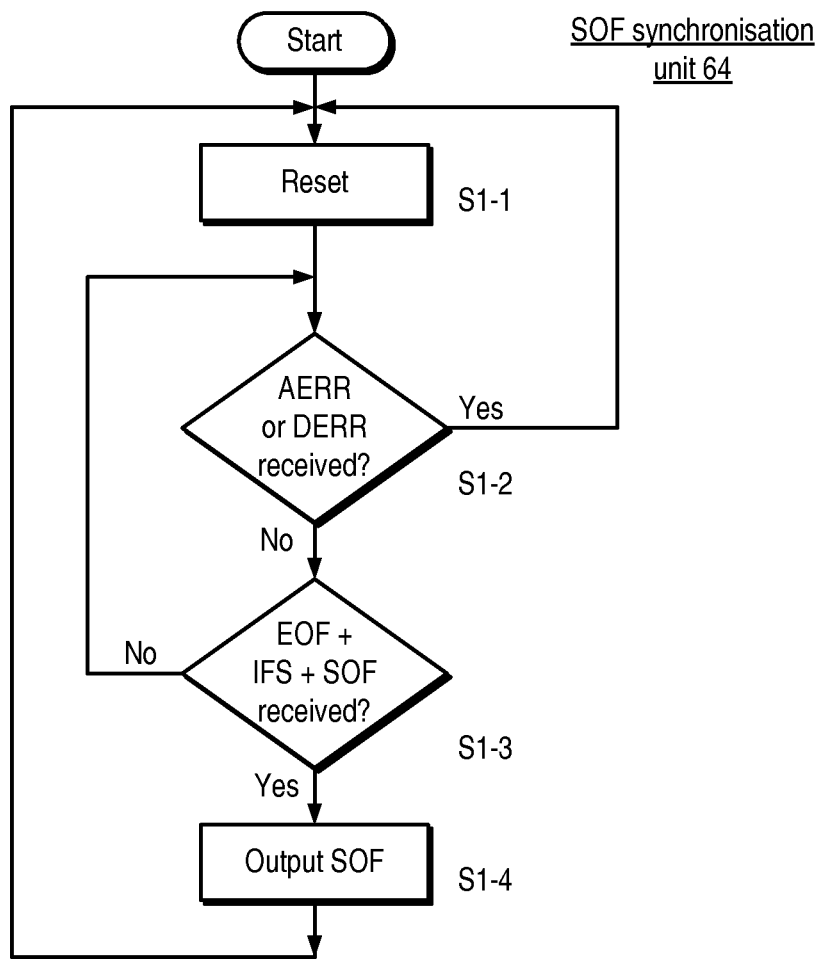
FIG. 7 is a process flow diagram of a method performed by the synchronisation unit shown in FIG. 6.

Referring to FIGS. 4, 6 and 7, after being reset (step S1-1), the SOF synchronization unit 64 checks for receipt of an arbitration phase error signal (AERR) or a data phase error signal (DERR) from the arbitration phase error detection unit 65 or data phase error detection unit 66 respectively (step S1-2). AERR and DERR flag the occurrence of an overload frame or an error frame, and will cause a reset of the SOF synchronization procedure.

If the SOF synchronization unit 64 does not receive an error signal (either AERR or DERR), it looks for the start of a CAN frame on RXD by searching for a synchronization pattern comprising the EOF (of a previous frame) and IFS followed by SOF which is set to a dominant bit (i.e. logical '0') (step S1-3).

When the SOF bit is found in RXD, the SOF synchronization unit 64 forwards SOF to the EDL flag detection block 67 (step S1-4).

During arbitration phases, the SOF synchronization unit 64 uses the bit timing of ATQCLK. During (CAN FD) data phases, the SOF synchronization unit 64 uses FDTQCLK to follow the bit stream. The data phases are indicated to the SOF synchronization unit 64 by the EDL flag detection block 67 using BRS.

The SOF synchronization unit 64 is reset if an overload frame or an error frame is received on RXD and will begin to search for a new synchronization pattern (step S1-2).

Arbitration Phase Error Detection Unit 65

Figure 8:
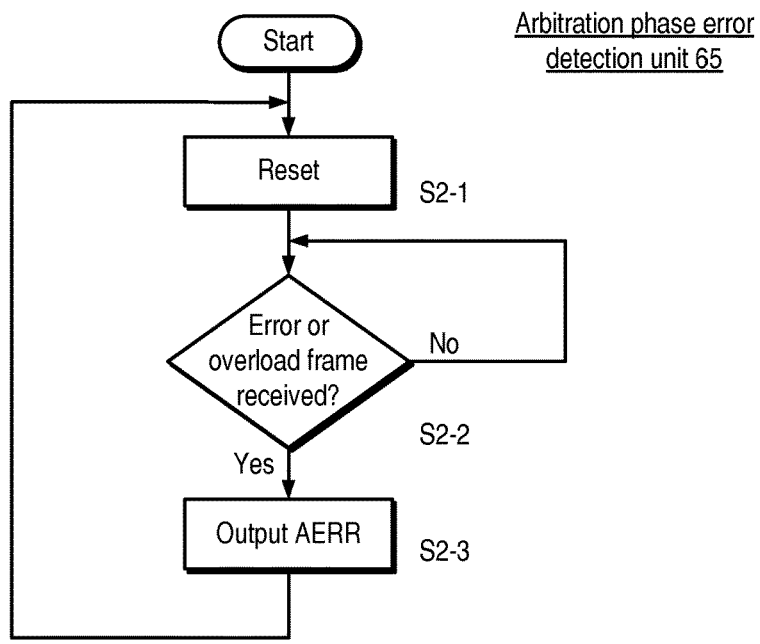
FIG. 8 is a process flow diagram of a method performed by the arbitration phase error detection unit shown in FIG. 6.

Referring to FIGS. 4, 6 and 8, after being reset (step S2-1), the arbitration phase error detection unit 65 detects error frames and overload frames in a RXD signal (RXDA). The EDL flag detection unit 67 forwards RXD as RXDA during a CAN frame 13 or the arbitration phases of a CAN FD frame 14.

When the arbitration phase error detection unit 65 detects an error frame or an overload frame, it sets AERR (steps S2-2 & S2-3).

FD Data Error Detection Unit 66

Figure 9:
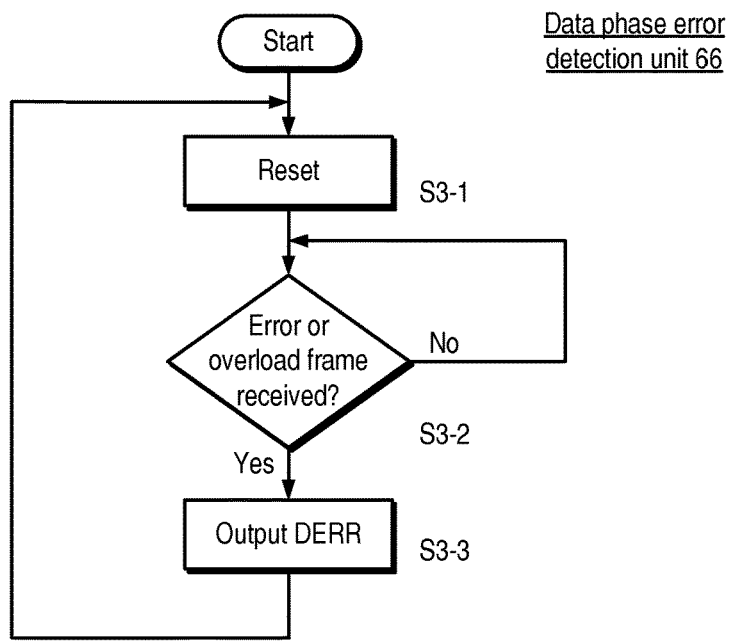
FIG. 9 is a process flow diagram of a method performed by the FD data phase error detection unit shown in FIG. 6.

Referring to FIGS. 4, 6 and 9, after being reset (step S3-1), the FD data error detection unit 66 detects error frames and overload frames in a RXD signal (RXDD). The FD data length detection block 68 forwards RXD as RXDD during a data phase of a CAN frame 13.

When the FD data error detection unit 66 detects an error frame or an overload frame, it sets DERR (steps S3-2 & S3-3).

The FD data error detection unit 66 flags error and overload frames for both standard and FD CAN frames.

EDL Flag Detection Unit 67

Figure 10:
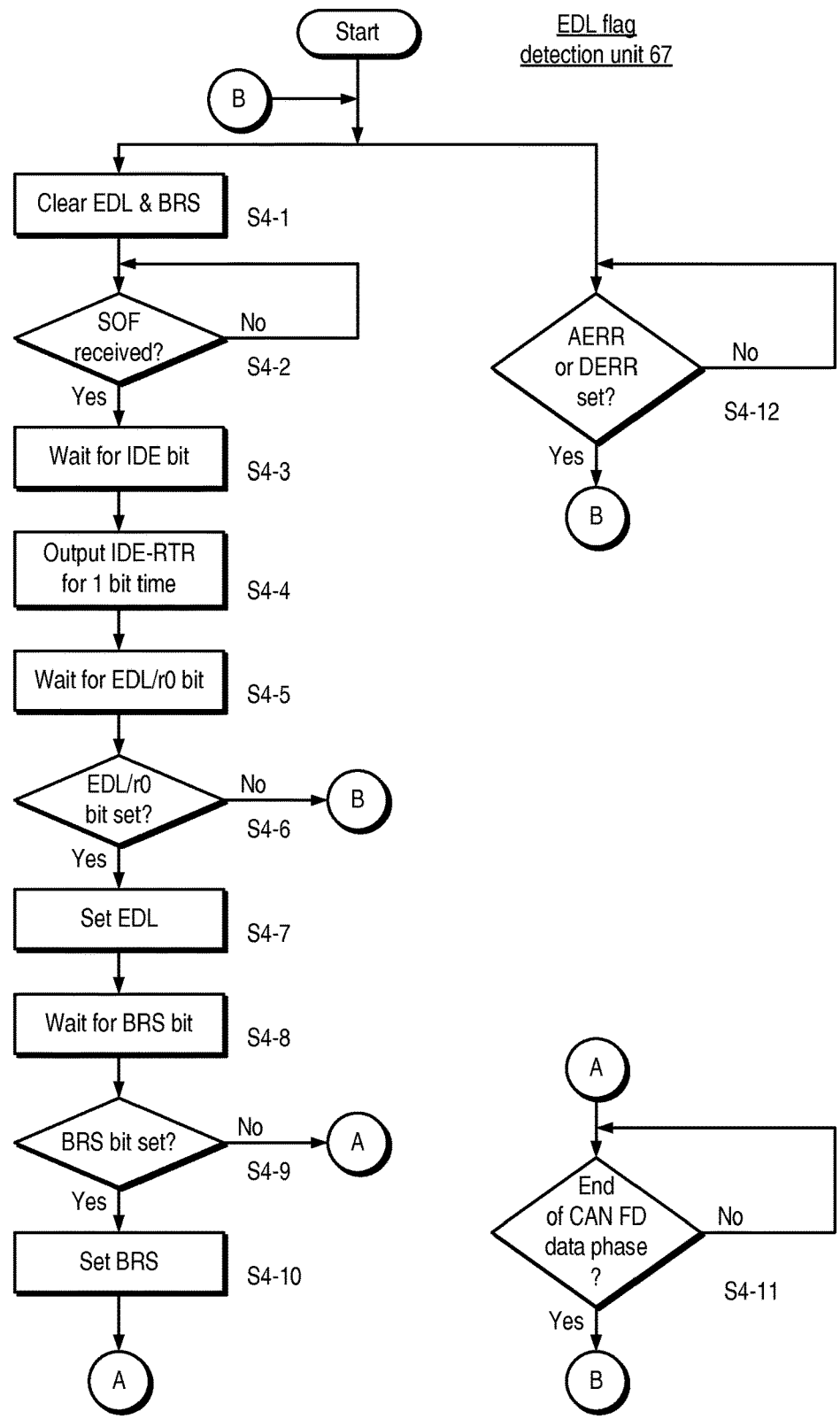
FIG. 10 is a process flow diagram of a method performed by the EDL flag detection unit shown in FIG. 6.
Figure 11A:
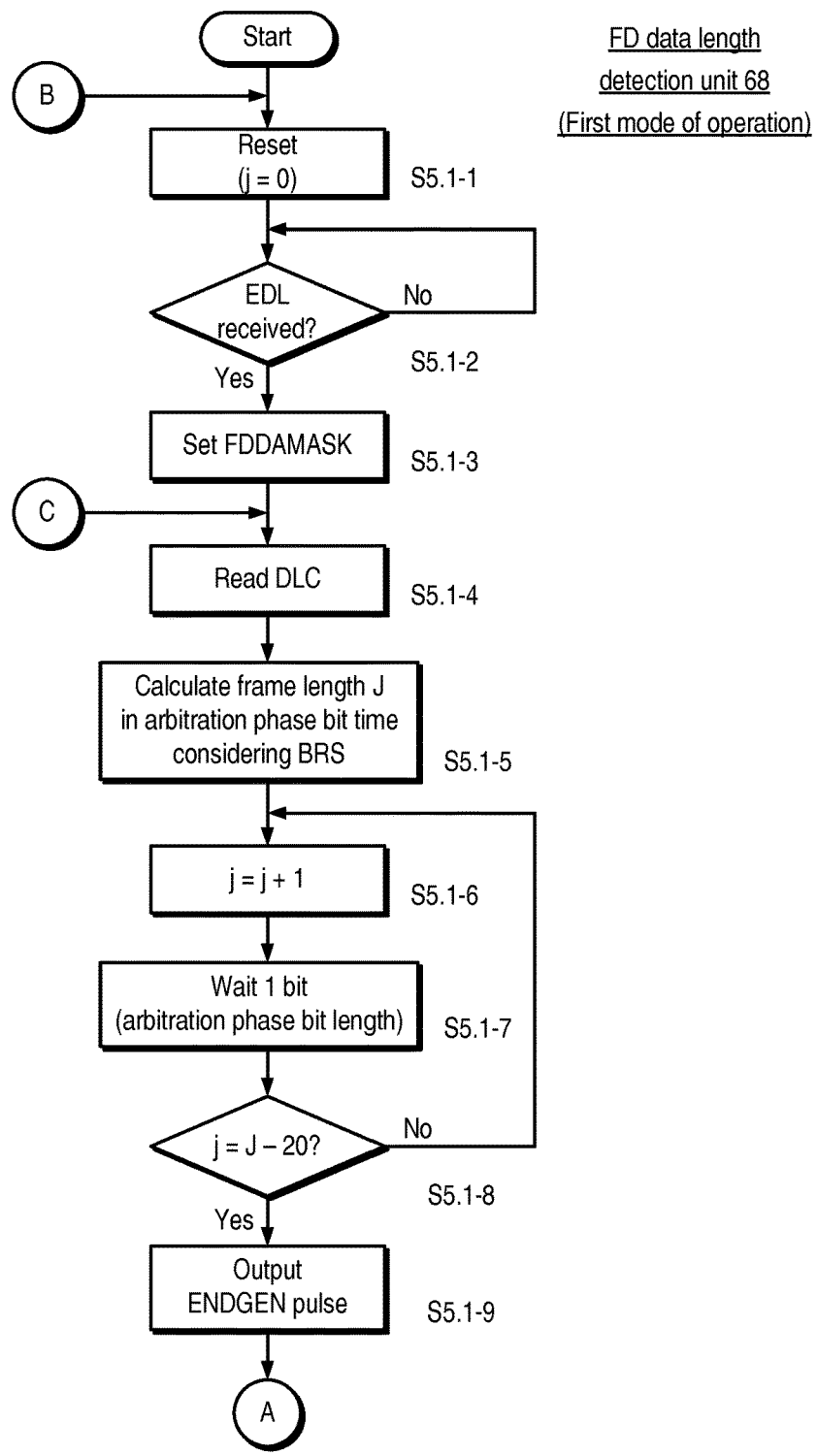
FIGS. 11A and 11B illustrate a process flow diagram of a method performed by the FD data length detection unit shown in FIG. 6 in a first operating mode.
Figure 11B:
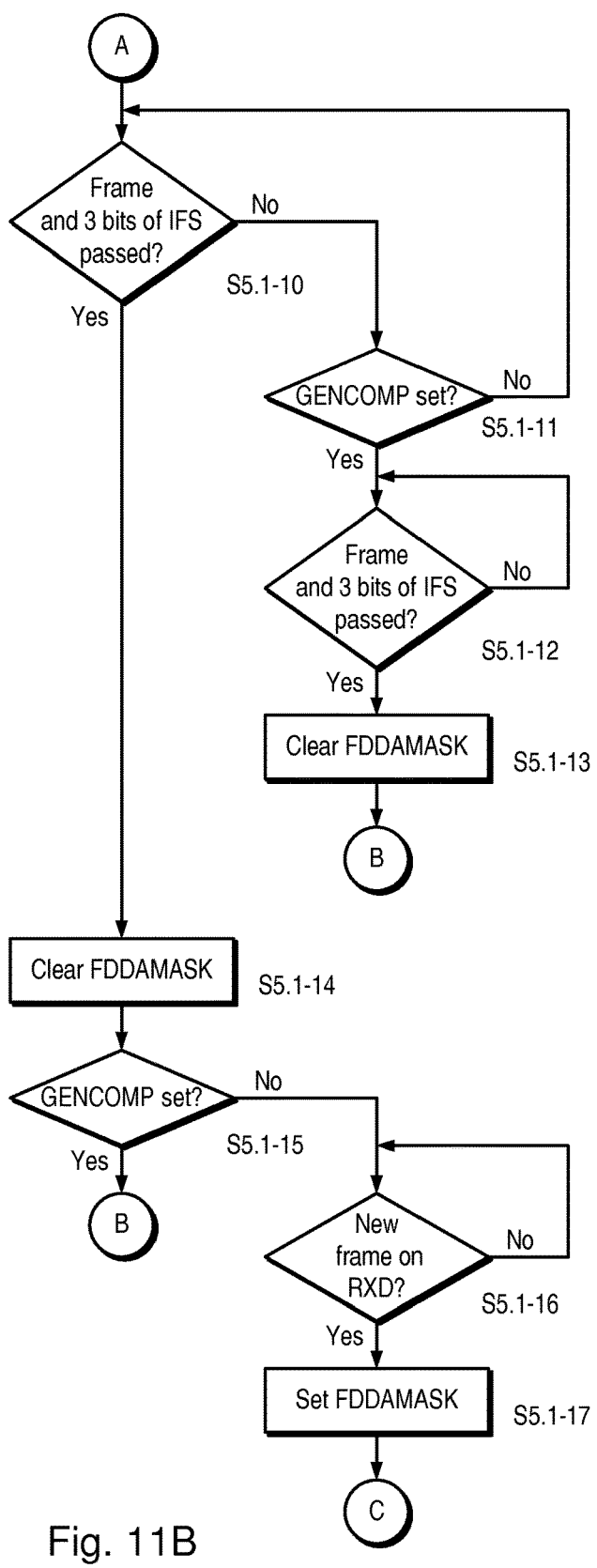
Figure 12:
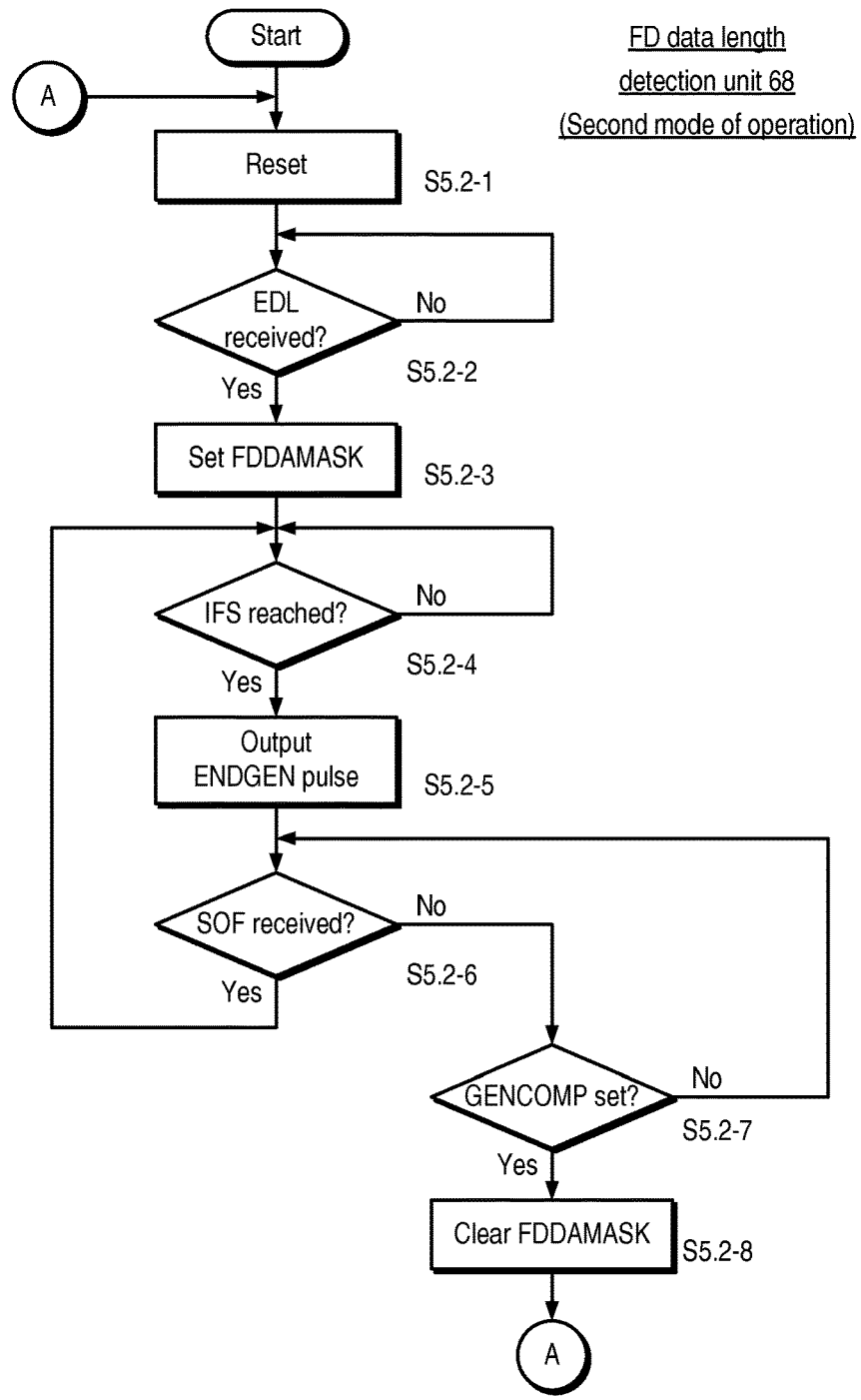
FIG. 12 illustrates a process flow diagram of a method performed by the FD data length detection unit shown in FIG. 6 in a second operating mode.

Referring to FIGS. 4, 6 and 10, the EDL flag detection unit 67 searches an incoming frame for the EDL bit (which may be referred to as the FDF bit). The EDL bit is located in a CAN FD frame 14 within a fixed number of bits (or "fixed bit distance") from the SOF.

The EDL flag detection unit 67 clears EDL and BRS (step S4-1) and waits for SOF (step S4-2). Once SOF has been found, it waits for the IDE bit (step S4-3) and marks the bit (for duration of 1 bit) using IDE-RTR (step S4-4).

The EDL flag detection unit 67 reads IDE to determine whether the frame has a base format or an extended format.

If IDE is dominant, then the frame has a base format and so the next bit is expected to be either an EDL bit (for a CAN FD frame) or a reserved bit r0 (for a CAN frame).

If IDE is recessive, then the frame has an extend format and so an extended arbitration field is expected. Thus, an identifier extension is expected, followed by reserved bit r1 (for a CAN FD frame) or RTR (for a CAN frame). After the arbitration field, the next bit is expected to be either an EDL bit (for a CAN FD frame) or a reserved bit r1 (for a CAN frame).

The EDL flag detection unit 67 waits for the bit where it expects to find an EDL bit (step S4-5) and inspects the bit (step S4-6). For a CAN FD frame, the EDL bit is recessive. For a CAN frame, the reserved bit r1 or r0 is dominant.

If the bit is not found set and a dominant bit (i.e. either r1 or r0) is found instead, then the frame is determined to be a CAN frame (i.e. not a CAN FD frame) and so the frame needs no further processing. Thus, the EDL flag detection unit 67 is reset (step S4-1) and waits for a new SOF (step S4-2).

If the bit is found set (i.e. it is recessive), the EDL flag detection unit 67 indicates this finding to the FD data length detection block 68 by setting EDL (step S4-7). In this case, the EDL flag detection unit 67 also checks for and forwards the BRS flag to the FD data length detection block 68 and SOF synchronization blocks 64 to allow them choose the appropriate bit rate (steps S4-8, S4-9 and S4-10).

If the EDL bit is not found set or if the data phase of a CAN FD frame 14 has finished (step S4-11), the EDL flag detection unit 67 is reset (step S4-1) and waits for a new SOF (step S4-2).

If an error in arbitration or data phases is found at any time, as indicated by the signals AERR and DERR respectively (step S4-12), then the EDL flag detection unit 67 is reset (step S4-1).

FD Data Length Detection Unit 68

Referring to FIGS. 4, 5 and 6, ENDGEN and FDDAMASK are used to control the RX replacer 52 which emulates a bus signal to the local (non-FD) CAN controller 6 (FIG. 3).

The RX replacer 52 indicates completion of insertion of substitute bits 21 to the FD data length detection unit 68 by setting GENCOMP. While FDDAMASK is set, the local CAN controller 6 (FIG. 3) is disconnected from the RXD and is fed with substitute data 21 (FIG. 4) by the RX replacer 52 and CTXD (i.e. transmit data from the controller 6) is not fed through CTXDS (i.e. it does not reach the CAN bus).

As explained earlier, the CAN FD/CAN FD passive converter 15 can operate in two different modes. Operation in the two modes are similar, differing mainly in the content of substitute bits 21.

FD Data Length Detection Unit 68 in the First Operating Mode

Referring to FIGS. 4, 5, 6, 11A and 11B, initially SOF, BRS, AERR, DERR, FDDAMASK and ENDGEN are cleared (step S5.1-1).

FD data length detection unit 68 waits to receive EDL from EDL flag detection unit 67 (step S5.1-2).

If the EDL bit is received (thus indicating the presence of a CAN FD frame 14), the FD data length detection unit 68 sets FDDAMASK (step S5.1-3). FDDAMASK continues to be set until the CAN FD frame 14 and a minimum length (in this case, 3 bits) of IFS (i.e. intermission bits) have passed (step S5.1-3 to S5.1-14). If the EDL bit indicates the presence of a CAN FD frame 14, it can be assumed that the local CAN controller 6 (FIG. 3) has lost arbitration and will stop transmitting because the EDL bit has already replaced a dominant bit, i.e. a r0 or r1 flag.

FD data length detection unit 68 sets ENDGEN a given number of bits (in this case 20 bits) before the end of a CAN FD frame 14 (i.e. the duration of an error flag including superposition (i.e. an initial error flag and additional error flags which lengthen the initial error flag) plus error delimiter before at least 3 bits of interframe space) so as to indicate that replacement of the CAN FD frame 14 should end soon (steps S5.1-4 to S5.1-9). To generate ENDGEN, the FD data length detection unit 68 decodes the CAN FD frame 14 (step S5.1-4), determines its length and data rate and predicts the length of the CRC field (step S5.1-5).

GENCOMP is expected from the RX replacer 52 as a response to ENDGEN after FDDAMASK is reset. If GENCOMP is set before any new frame appears on RXD, then processing is determined to have been completed and so the FD data length detection unit 68 is reset and starts to wait for another CAN FD frame 14. Otherwise, FDDAMASK is set again and remains set until the frame and 3 bits of IFS have passed after which ENDGEN is again generated.

The RX replacer 52 sets GENCOMP after ENDGEN is set by the FD data length detection unit 68 and while no more signal generation is taking place on CRXD.

If BRS is set in addition to EDL being, then FD data length detection unit 68 recognises the data phase of the CAN FD frame 14 and uses FDTQCLK instead of ATQCLK.

If an error in the data phase is found and is indicated by DERR, then the FD data length detection unit 68 is reset when FDDAMASK is cleared.

Thus, the FD data length detection unit 68 waits until for the frame and 3 bits of IFS to pass (step S5.1-10). While it waits, the FD data length detection unit 68 checks whether GENCOMP is set (step S5.1-11).

If GENCOMP is set in the meantime, then the FD data length detection unit 68 waits until the frame and 3 bits of IFS, i.e. intermission bits, have passed (step S5.1-12), clears FDDAMASK (step S5.1-13) and is reset (step S5.1-1).

If GENCOMP is not set in the meantime, then once the frame and 3 bits of IFS have passed, the FD data length detection unit 68 clears FDDAMASK (step S5.1-14).

The FD data length detection unit 68 checks whether GENCOMP has been set (step S51.15). If GENCOMP has been set, then the FD data length detection unit 68 is reset (step S5.1-1). If GENCOMP has not been set, then the FD data length detection unit 68 waits until a new frame is received on RXD (step S5.1-16). If a new frame is received, FDDAMASK is set again and remains set until the frame and 3 bits of IFS have passed after which ENDGEN is again generated (steps S5.1-4 to S5.1-9).

FD Data Length Detection Unit 68 in the Second Operating Mode

Referring to FIGS. 4, 5, 6 and 12, initially SOF, BRS, AERR, DERR, FDDAMASK and ENDGEN are cleared (step S5.2-1).

FD data length detection unit 68 waits to receive EDL from EDL flag detection unit 67 (step S5.2-2).

If the EDL bit is received (thus indicating the presence of a CAN FD frame 14), FD data length detection unit 68 sets FDDAMASK (step S5.2-3). FDDAMASK continues to be set until the CAN FD frame 14 ends and IFS is reached (step S5.2-4).

When IFS has been reached, ENDGEN indicates that replacement of the CAN FD frame 14 should end (step S5.2-5).

GENCOMP is expected from the RX replacer 52 as a response to ENDGEN being set.

If GENCOMP is set before the next frame appears on RXD, then processing is deemed to have been completed and the FD data length detection unit 68 is reset and waits for the next CAN FD frame 14.

If GENCOMP is clear, FDDAMASK is still set and a new frame appears on RXD, then the frame is also processed. A new ENDGEN signal is generated at the start of IFS, after this frame.

The RX replacer 52 sets GENCOMP when ENDGEN is set by the FD data length detection unit 68 and no signal generation is ongoing on CRXD.

If BRS is also set (in addition to EDL), then FD data length detection unit 68 recognises the data phase of the CAN FD frame 14 and uses FDTQCLK instead of ATQ-CLK.

If an error in the data phase is found and is indicated by DERR, then the FD data length detection unit 68 is reset when FDDAMASK is cleared.

Thus, the FD data length detection unit 68 checks whether a new frame has been received (step S5.2-6). If so (i.e. a new frame has been received), then a new ENDGEN signal is generated at the start of IFS, after the new frame (step S5.2-4 & S5.2-5).

However, if no new frame has been received, then the FD data length detection unit 68 continues to check whether GENCOMP has been set until a new frame is received (step S5-2.7). If GENCOMP has not been set, then the FD data length detection unit 68 continues to check for a new frame (step S5-2.7). Once a new frame is received, the FD data length detection unit 68 keeps FDDAMASK set until this frame has passed too (IFS reached). Otherwise, if GENCOMP has been set after S5.2-6, FDDAMASK is cleared (S5.2-8) and the processing is completed.

RX Replacer Unit 52

Figure 13:
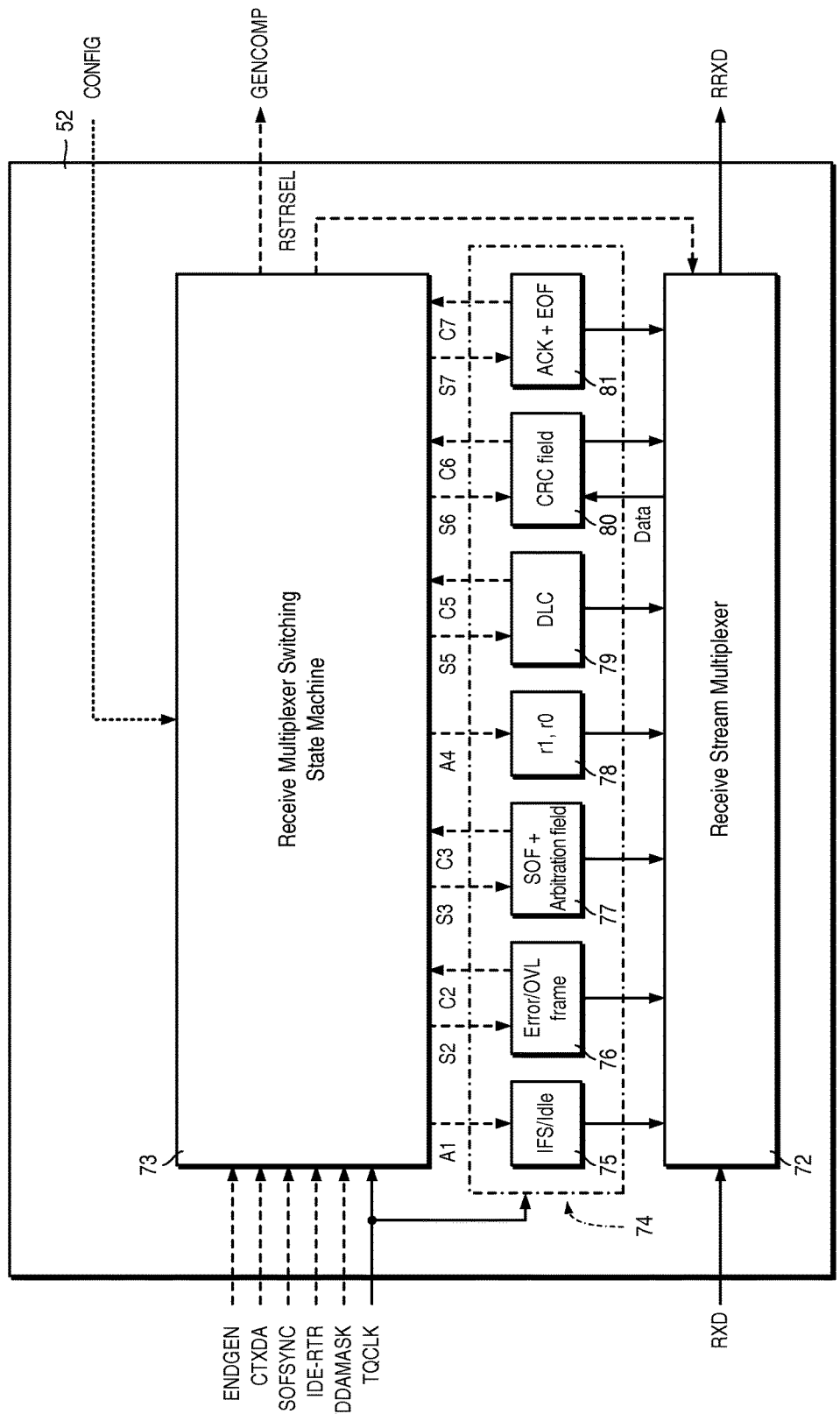
FIG. 13 is a schematic block diagram of a RX replacer which includes a receive multiplexer switching state machine.

Referring to FIG. 13, the RX replacer unit 52 is shown in more detail.

The RX replacer unit 52 includes a receive stream multiplexer 72, a receive multiplexer switching state machine 73 and a set of generators 74 for generating substitute data 21 (FIG. 4).

The generators 74 include an IFS/idle generator 75, an error and overload frame generator 76, an SOF and arbitration field generator 77, a dominant r1/r0 bit generator 78, a DLC (indicating no data) field generator 79, a CRC field generator 80 and an ACK and EOF field generator 81.

In response to receiving a first activate signal ($A_1$) from the receive multiplexer switching state machine 73, the IFS/idle generator 73 provides IFS/idle to the receive stream multiplexer 72. In response to receiving a second activate signal ($S_2$), the error and overload frame generator 76 provides an error or overload frame (depending on the mode of operating) to the receive stream multiplexer 72 and, when finished, returns a complete signal ($C_2$) to the receive multiplexer switching state machine 73. In response to receiving an third activate signal ($S_3$), the SOF and arbitration field generator 77 generates SOF and arbitration field bits and, when finished, returns a complete signal ($C_3$). In response to receiving a fourth activate signal ($A_4$), the dominant bit generator 75 provides an appropriate dominant bit r1, r0. In response to receiving a fifth activate signal ($S_5$), the DLC/no data phase signal generator 79 generates a DLC/no data phase bits and, when finished, returns a complete signal ($C_5$).

In response to receiving a sixth activate signal ($S_6$) from the receive multiplexer switching state machine 73 and receiving data bits from the receive stream multiplexer 72, the CRC field generator 80 provides CRC data to the receive stream multiplexer 72 and, when finished, returns a complete signal ($C_6$) to the receive multiplexer switching state machine 73. In response to receiving a seventh activate signal ($S_7$), the ACK and EOF field generator 81 generates ACK and EOF field and, when finished, returns a complete signal ($C_7$) to the receive multiplexer switching state machine 73.

Receive Stream Multiplexer 72

Referring still to FIG. 13, depending on a selection signal (RSTRSEL) received from the receive multiplexer switching state machine 73, the receive stream multiplexer 72 forwards either the stream received on RXD or the output of one of the generators 74 to RRXD. If the output of a generator 74 is forwarded to RRXD, then the local CAN controller 6 (FIG. 3) does not see the CAN bus signal RXD. Thus, the local CAN controller 6 (FIG. 3) is effectively decoupled from the CAN bus.

Receive Multiplexer Switching State Machine 73

The state machine 73 activates appropriate generators 75, 76, 77, 78, 79, 80, 81 using activate signals $A_1$, $S_2$, $S_3$, $A_4$, $S_5$, $S_6$, $S_7$ depending on input conditions and watches completion signals $C_2$, $C_3$, $C_5$, $C_6$, $C_7$.

Referring to FIGS. 4 and 13, the state machine 73 controls whether the multiplexer 72 forwards RXD or output from the generators 75, 76, 77, 78, 79, 80, 81 using RSTRSEL. When RSTRSEL is set, the output from a generator 75, 76, 77, 78, 79, 80, 81 is placed on RRXD.

When CAN frames 13 (FIG. 3) are forwarded to RRXD, the state machine 73 operates using TQCLK.

Operation of the state machine 73 when operating in the first mode will now be described in more detail:

If SOFSYNC is set and none of the generator 75, 76, 77, 78, 79, 80, 81 are currently active, then state machine 73 is reset. If, however, SOFSYNC is set and a generator 75, 76, 77, 78, 79, 80, 81 is currently active (for example, because at least one of the completion signals $C_2$, $C_3$, $C_5$, $C_6$, $C_7$ is set), then state machine 73 is not reset until all of the generators 75, 76, 77, 78, 79, 80, 81 are inactive.

When IDE-RTR is set thereby indicating that an EDL flag will follow, then the EDL flag is replaced by a r1/r0 bit (i.e. in dominant state). Thus, any frame that become visible on RRXD are marked as CAN frames, i.e. non-FD frames.

When FDDAMASK is set, a substitute frame 22 is generated on RXXD by appending a DLC field indicating a zero-length data field followed by CRC, ACK, EOF and IFS fields thereby replacing the stream received on RXD. If FDDAMASK is still active after these fields have been inserted, then a bus idle signal is generated and placed on RRXD.

If the signal ENDGEN is set (thereby indicating that signal generation should be completed), any on-going frame generation is aborted by inserting an error frame.

If the local CAN controller 6 (FIG. 3) tries to start sending a frame on TXD by transmitting a dominant SOF (which signalled to the RX replacer 52 by the CTXDA flag) while FDDAMASK is active and a bus idle signal is currently on RRXD (i.e. after generation of a substitute frame 22 has been completed), the generator generates a competing frame on RRXD which includes an arbitration field, followed by a zero-length indicating DLC field, CRC and ACK fields. Accordingly, transmission by the local CAN controller 6 (FIG. 3) is aborted due to loss of arbitration during the arbitration field and no transmission error being generated. The arbitration field generated by the RX replacer unit 52 has higher priority than the arbitration field of any frame originating from the local CAN controller 6.

When FDDAMASK is inactive, the signal RXD is forwarded to RRXD.

If FDDAMASK is reset and no signal generation is currently on-going and ENDGEN has been set, then GENCOMP is set.

Any bus activity on TXDA while FDDAMASK is set causes generation of another SOF, arbitration field and zero-length data phase. If, in the meanwhile, ENDGEN is set and FDDAMASK is reset, substitute frame generation is aborted with an error frame and GENCOMP is set after completion of error frame generation.

In order to generate the CRC field correctly, the de-stuffed bit stream received on RXD is considered during the arbitration phase of the CAN FD frame 14. Therefore, the RX replacer 52 records all frame content received on RXD during the arbitration phase of the replaced CAN FD frame and calculates the CRC during this process taking into account any appended or generated frame data parts.

Functioning of RX replacer 52 can be suppressed by using the RX multiplexer 53 (FIG. 5) to select the RXD. This can be set using the SPI interface 60 (FIG. 5).

Operation of the state machine 73 when operating in the second mode will now be described in more detail:

If SOFSYNC is set and none of the generators 75, 76, 77, 78, 79, 80, 81 are currently active, then state machine 73 is reset. If, however, SOFSYNC is set and a generator 75, 76, 77, 78, 79, 80, 81 is currently active (for example, because at least one of the completion signals $C_2, C_3, C_5, C_6, C_7$ is set), then state machine 73 is not reset until all of the generators 75, 76, 77, 78, 79, 80, 81 are inactive.

When IDE-RTR is set thereby indicating that an EDL flag will follow, then the EDL flag is replaced by a r1/r0 bit (i.e. in dominant state). Thus, any frame that become visible on RRXD is marked as a CAN frame, i.e. a non-FD frame.

When FDDAMASK is activated, a DLC field indicating zero-length data field, a CRC field, ACK field, EOF field and IFS are placed on RRXD thereby replacing the stream received on RXD by a substitute frame 22. If FDDAMASK is still active after the frame has been inserted on RRXD, overload frames are repeatedly placed on RRXD to suppress any attempts to transmit frames by the local CAN controller 6 (FIG. 3).

To generate the CRC field correctly, the de-stuffed bit stream RXD is considered for the arbitration phase of the CAN FD frame. Therefore, the RX-replacer 52 records all frame content at RXD in the arbitration phase of the replaced CAN FD frame and calculates the CRC during this process taking into account appended or generated frame data parts, too.

The functionality of this block can be suppressed by using the RX MUX function to select the RXD input directly by means of the SPI interface.

In this operation mode, CTXDA is not used since it indicates an attempt by the local CAN controller 6 (FIG. 3) to transmit. However, such a transmission is suppressed by overload frames.

TX Gating/Dominant Suppression Unit 53

Figure 14:
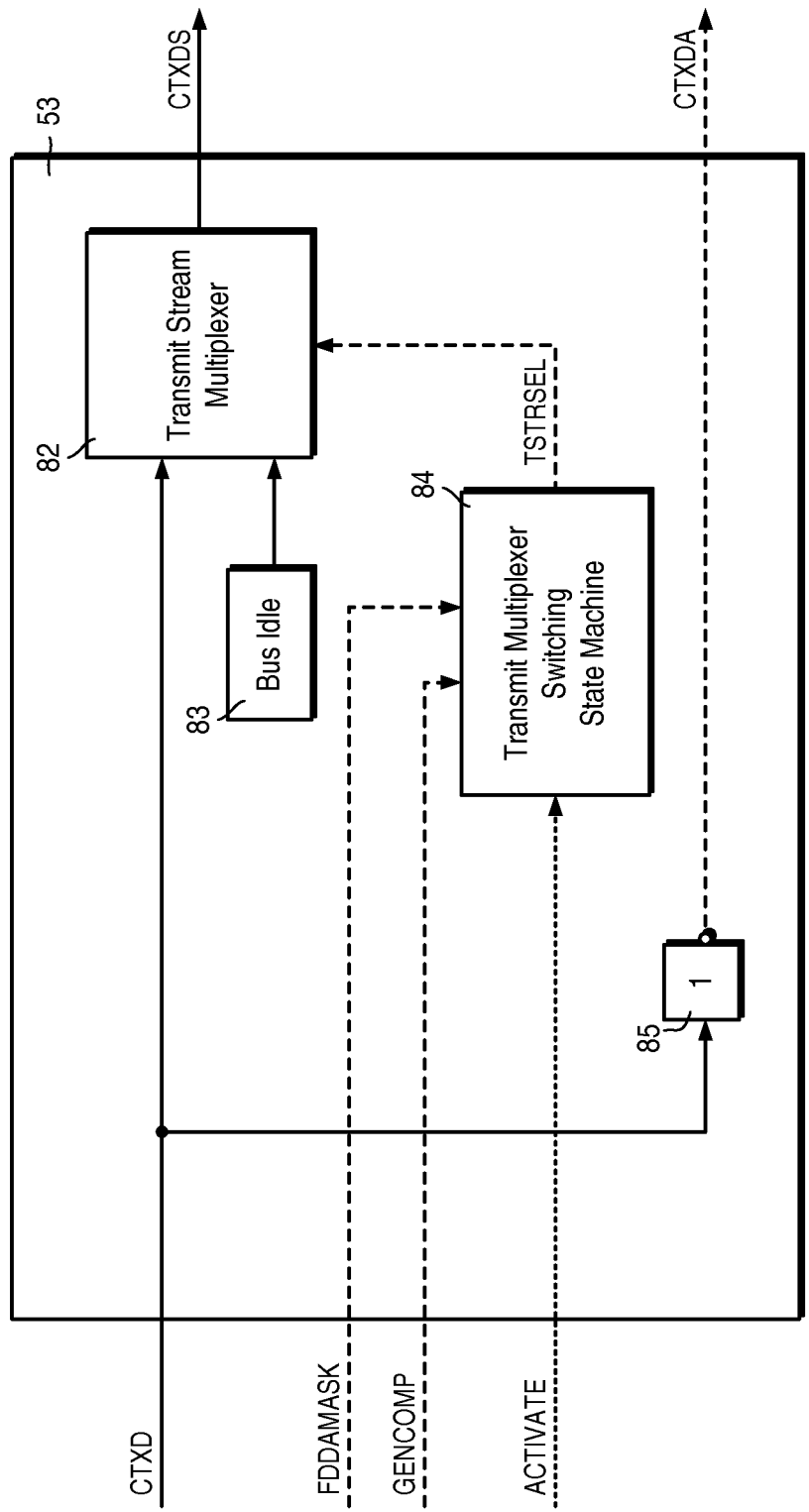
FIG. 14 is a schematic block diagram of a TX gating and dominant bit suppressing unit.

Referring to FIG. 14, the TX gating/dominant suppression unit 53 is shown in more detail.

The unit 53 includes an activation flag (ACTIVATE) from the SPI interface 161, a transmit stream multiplexer 82, a bus idle signal generator 83, a transmit multiplexer switching state machine 84 and an inverter 85.

Transmit Stream Multiplexer 82

Depending on the selection signal (TSTRSEL) from the transmit multiplexer switching state machine 84, the transmit stream multiplexer 82 forwards either CTXD or a bus idle signal (which is recessive level) to CTXDS.

The transmit multiplexer switching state machine 84 can be activated and de-activated by configuration using the signal ACTIVATE.

Transmit Multiplexer Switching State Machine 84

As soon as FDDAMASK is set, the state machine 84 sets TSTRSEL thereby selecting the bus idle signal (which is recessive) as the output for CTXDS. TSTRSEL remains set and the recessive bus idle signal remains selected until GENCOMP indicates the completion of internal signal generation.

EXAMPLES

FIGS. 15 to 19 illustrate examples of the CAN FD/CAN FD passive converter 15 (FIG. 3) in operation.

Figure 15:
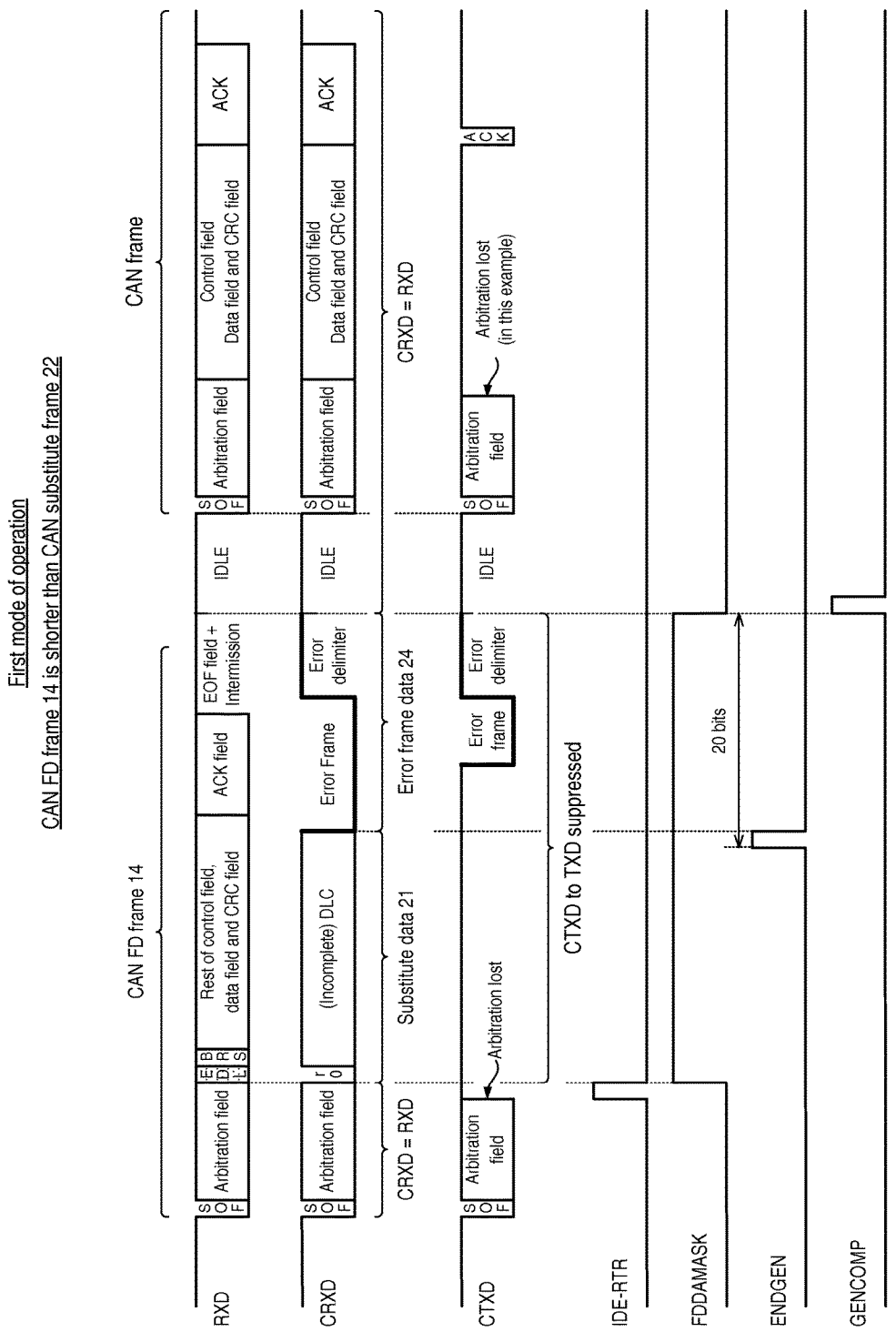
FIG. 15 is a timing diagram showing RXD, CRXD and CTXD data signals and IDE-RTR, FDDDAMASK, ENDGEN and GENCOMP control signals illustrating processing of a short CAN FD frame by a CAN FD/CAN FD passive converter operating in a first operating mode.

FIG. 15 illustrates processing of a CAN FD frame 14 by the CAN FD/CAN FD passive converter 15 (FIG. 5) operating in a first mode. The CAN FD frame 14 is short, i.e. shorter than CAN substitute frame 22 which is used to replace it.

As shown in FIG. 15, the CAN FD frame 14 is received on RXD and includes a SOF field, an arbitration field, EDL and BRS bits, the rest of the control field, a data field and a CRC field, an ACK field and EOF field. The frame 14 is followed by IFS, bus idle and then a (standard) CAN 2.0B frame including SOF, an arbitration field, a control field, a data field and a CRC field, and an ACK field.

Referring to FIGS. 5 and 15, the RX replacer 52 transmits the SOF and arbitration fields to RRXD which pass through RX multiplexer 53 to CRXD. The FD detection unit 51 signals the EDL bit by setting IDE-RTR and then sets FDDAMASK.

The RX replacer 52 sets RSTRSEL (FIG. 13) and starts generation of substitute bits 21. The RX replacer 52 generates IDE (in the case of a base format frame) or the reserved bit r1 (in the case of an extended format frame), the reserved bit r0 and DLC bits indicating zero length data field which are placed on RRXD and pass through RX multiplexer 53 to CRXD. IDE/reserved bit r0 is not shown for clarity.

The FD detection unit 51 determines that the end of the CAN FD 14 is approaching (i.e. that is 20 bits away from the start of IFS) so sets ENDGEN. Activation of ENDGEN causes the RX replacer 52 to stop its substitute frame generation and to generate an error frame and error delimiter which are placed on RRXD and pass through RX multiplexer 53 to CRXD.

The FD detection unit 51 de-activates FDDAMASK after the CAN FD frame has passed 14. The RX replacer 52 resets RSTRSEL (FIG. 13) after it has completed the error frame and acknowledges that generation of substitute bits 21 has stopped by setting GENCOMP.

As shown in FIG. 15, a CAN frame is subsequently received on RXD. The RX replacer 52 transmits the CAN frame to RRXD which passes through RX multiplexer 53 to CRXD.

Figure 16:
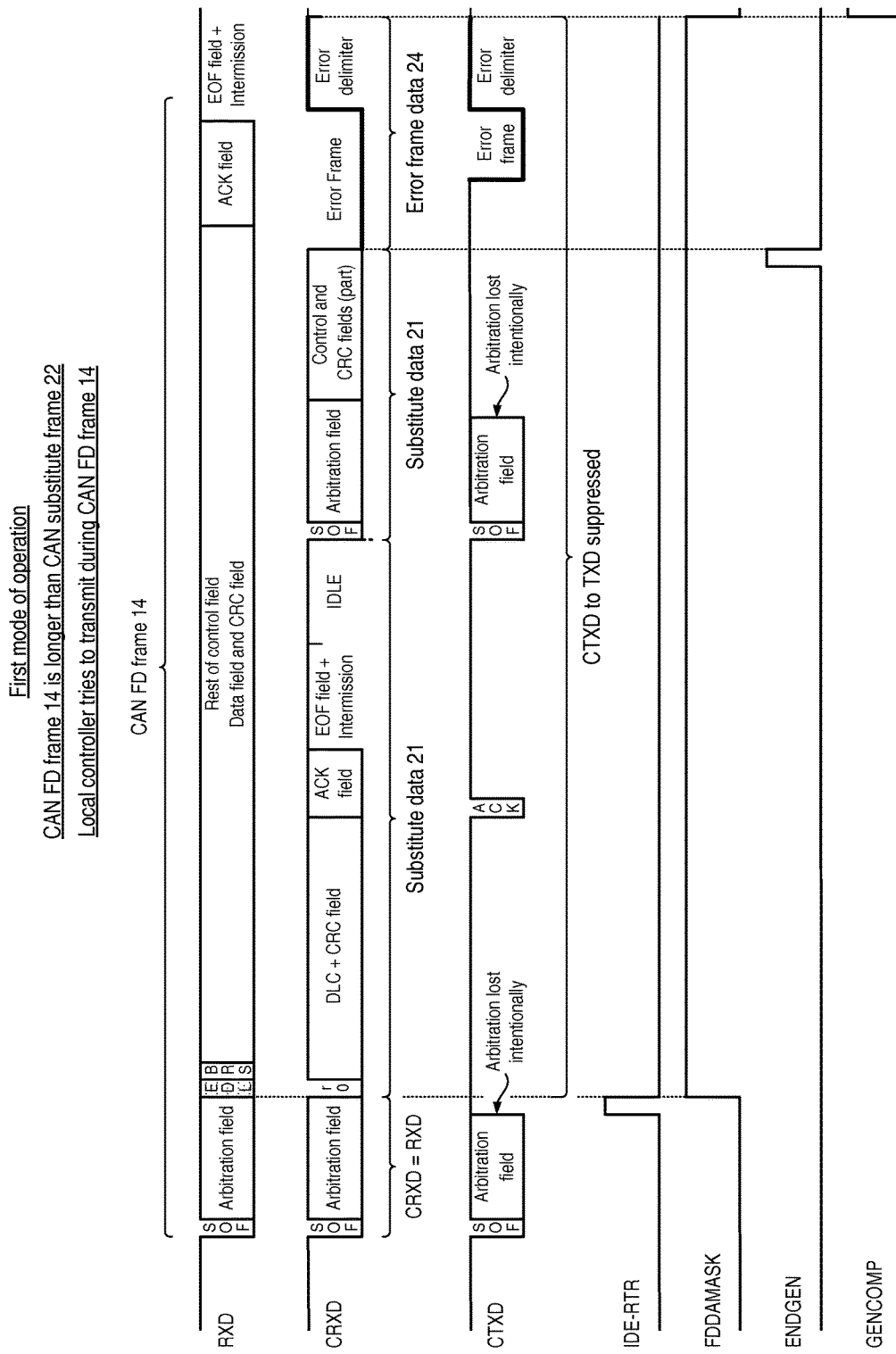
FIG. 16 is a timing diagram showing RXD, CRXD and CTXD data signals and IDE-RTR, FDDDAMASK, ENDGEN and GENCOMP control signals illustrating processing of a long CAN FD frame by a CAN FD/CAN FD passive converter operating in a first operating mode.

FIG. 16 illustrates processing of a CAN FD frame 14 by the CAN FD/CAN FD passive converter 15 (FIG. 5) operating in a first mode. The CAN FD frame 14 is long, i.e. longer than a CAN substitute frame 22 which is used to replace it.

As shown in FIG. 16, the CAN FD frame 14 is received on RXD and includes a SOF field, an arbitration field, EDL and BRS bits, the rest of the control field, a data field and a CRC field, an ACK field and EOF field. The frame 14 is followed by IFS.

Referring to FIGS. 5 and 16, the RX replacer 52 transmits the SOF and arbitration fields to RRXD which pass through RX multiplexer 53 to CRXD. The FD detection unit 51 signals the EDL bit by setting IDE-RTR and then sets FDDAMASK.

The RX replacer 52 sets RSTRSEL (FIG. 13) and starts generation of substitute bits 21. The RX replacer 52 generates IDE (in the case of a base format frame) or the reserved bit r1 (in the case of an extended format frame), the reserved bit r0 and DLC bits indicating zero length data field, then CRC, ACK, EOF and IFS data and then idle which are placed on RRXD and pass through RX multiplexer 53 to CRXD which are placed on RRXD and pass through RX multiplexer 53 to CRXD. IDE/reserved bit r0 is not shown for clarity.

The RX replacer 52 determines whether FDDAMASK has been set. Since FDDAMASK is still set and the local CAN controller 6 (FIG. 3) is starting to send a frame (CTXDA set by SOF), the RX replacer 52 continues to generate substitute bits 21 for the substitute frame 22. The RX replacer 52 generates SOF and arbitration fields so that the local CAN controller 6 (FIG. 3) loses the arbitration.

The FD detection unit 51 determines that the end of the CAN FD 14 is approaching (i.e. that is 20 bits away from the start of IFS) so sets ENDGEN. Activation of ENDGEN causes the RX replacer 52 to abort its substitute frame 22 generation and to generate an error frame and error delimiter which are placed on RRXD and pass through RX multiplexer 53 to CRXD.

The FD detection unit 51 de-activates FDDAMASK after the CAN FD frame 14 is complete and the CAN bus is idle. The RX replacer 52 resets RSTRSEL (FIG. 13) and acknowledges that generation of substitute bits 21 has stopped with the completion of the error frame including delimiter by setting GENCOMP.

Figure 17:
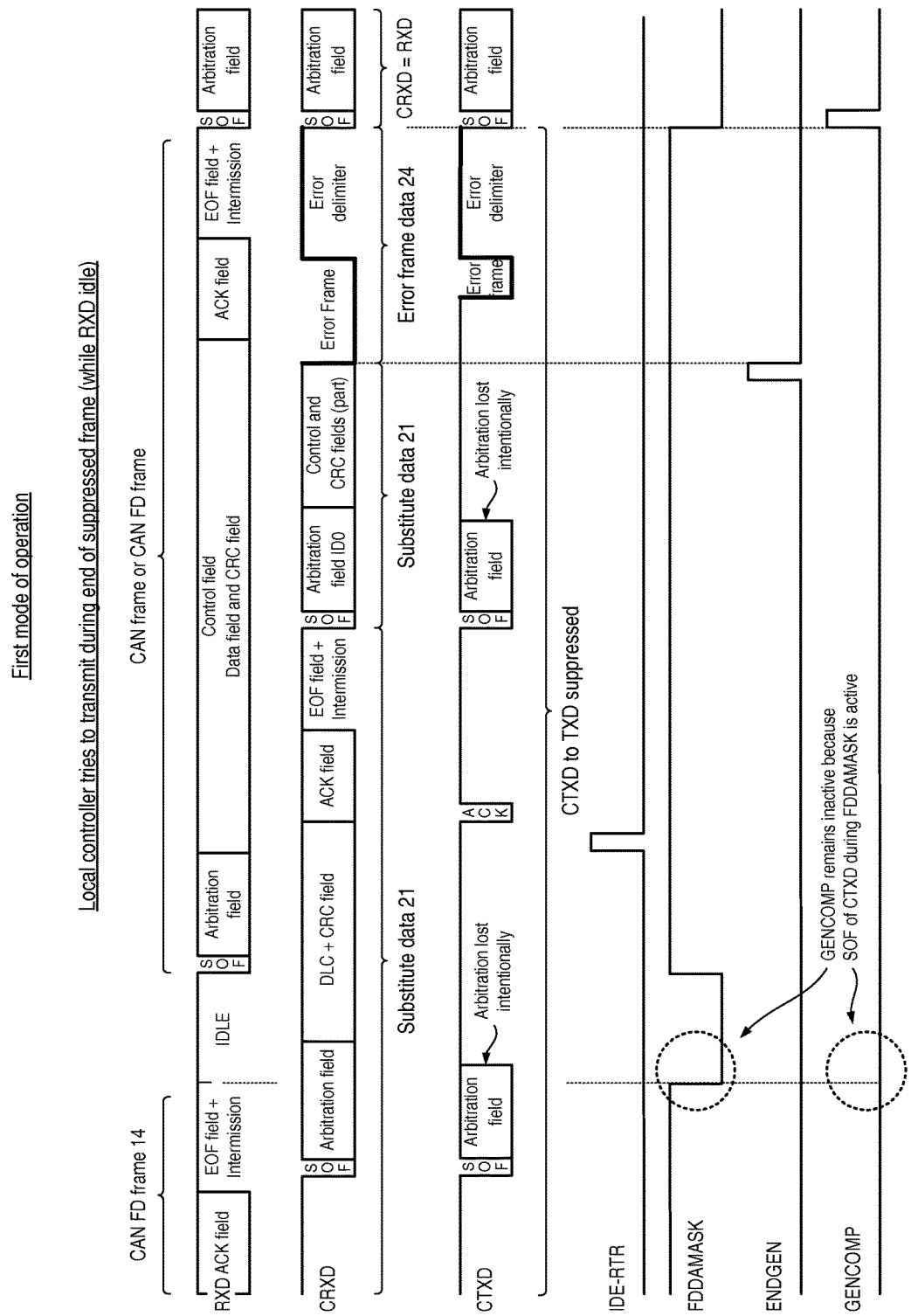
FIG. 17 is a timing diagram showing RXD, CRXD and CTXD data signals and IDE-RTR, FDDDAMASK, ENDGEN and GENCOMP control signals illustrating processing of a CAN FD frame by a CAN FD/CAN FD passive converter operating in a first operating mode and a local controller attempting to transmit at the end of transmission of substitute data.

FIG. 17 illustrates how the CAN FD/CAN FD passive converter 15 (FIG. 5) reacts when the local controller 6 (FIG. 3) tries to start transmitting towards the end a stream of substitute data when it is operating in the first mode.

As shown in FIG. 17, the local CAN controller 6 (FIG. 3) tries to start transmitting on CTXD while the RX replacer 52 generates substitute data 21.

Referring to FIGS. 5 and 17, if the local CAN controller 6 (FIG. 3) tries to start transmitting on CTXD while the RX replacer 52 generates substitute data 21, the RX replacer 52 does not generate GENCOMP even though FDDAMASK indicates that the CAN FD frame 14 has ended. Thus, substitute frame 22 generation continues.

If another frame (where it be a CAN frame or a CAN FD frame) appears on the bus (i.e. RXD), then the RX replacer 52 continues to generate the substitute frame 22. This is because the FD detection unit 52 did not receive GENCOMP in response to ENDGEN (not shown) and so it sets FDDAMASK again.

If the local CAN controller 6 (FIG. 3) again tries sending a frame, then this triggers another substitute frame 22 to be generated. The FD detection unit 51 sets ENDGEN once again, if the frame on the bus reaches its end. Substitute frame generation is aborted with an error frame and error frame delimiter.

The local controller 6 (FIG. 3) should allow the error frame including its delimiter to pass. Since this frame is in line with the end of the frame on the bus, then, after FDDAMASK and GENCOMP are cleared, the local controller 6 (FIG. 3) may finally send its pending frame. RSTRSEL is cleared and so this frame reaches CTXD and is fed back on RXD.

Figure 18:
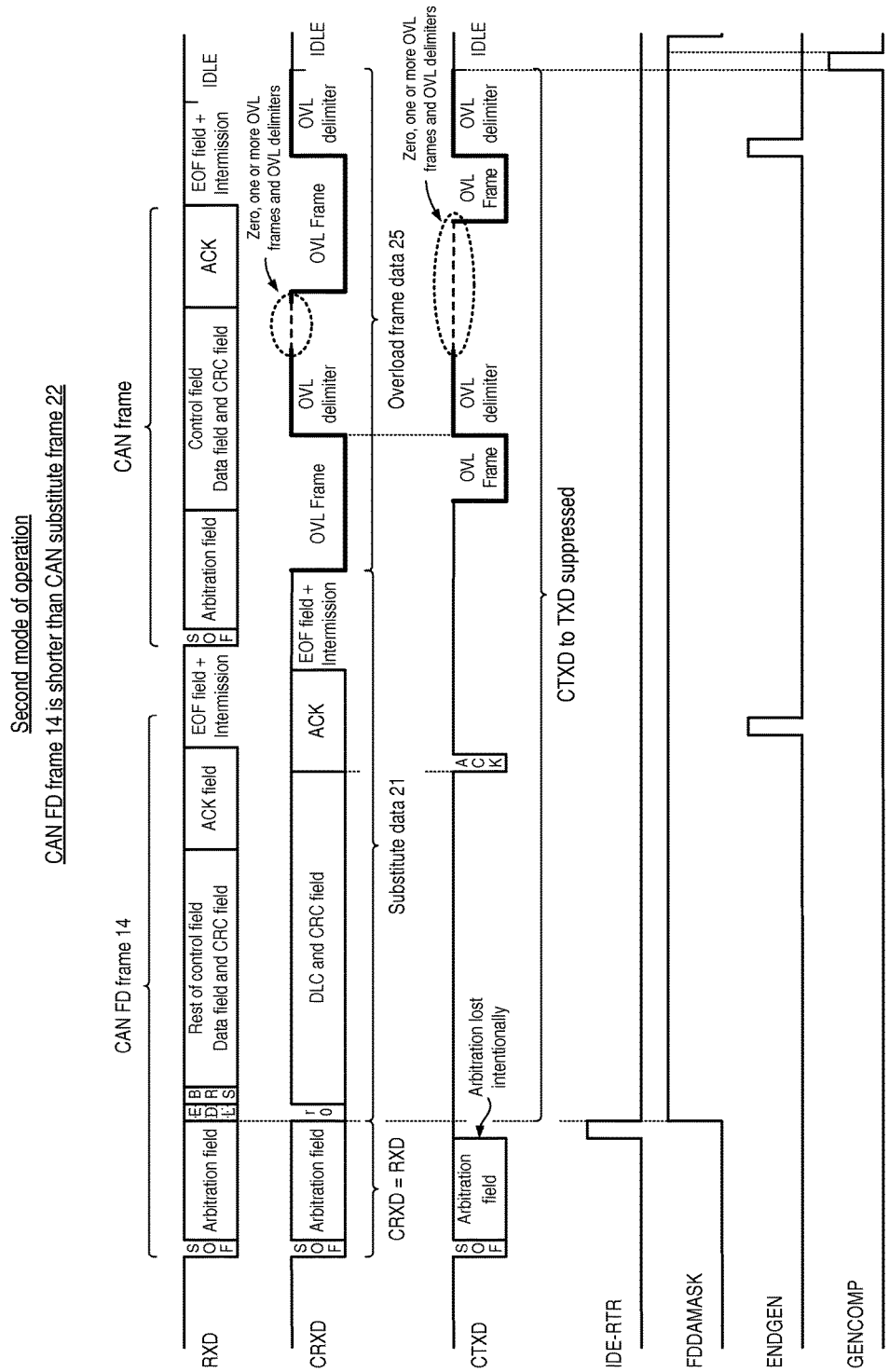
FIG. 18 is a timing diagram showing RXD, CRXD and CTXD data signals and IDE-RTR, FDDDAMASK, ENDGEN and GENCOMP control signals illustrating processing of a short CAN FD frame by a CAN FD/CAN FD passive converter operating in a second operating mode.

FIG. 18 illustrates processing of a CAN FD frame 14 by the CAN FD/CAN FD passive converter 15 (FIG. 5) operating in a second mode. The CAN FD frame 14 is short, i.e. shorter than a CAN substitute frame 22 which is used to replace it.

As shown in FIG. 18, the CAN FD frame 14 is received on RXD and includes a SOF field, an arbitration field, EDL and BRS bits, the rest of the control field, a data field and a CRC field, an ACK field and EOF field. The frame 14 is followed by IFS, then a CAN frame including SOF, an arbitration field, a control field, a data field and a CRC field, an ACK field and an EOF field, followed by IFS, after which the bus is idle.

Referring to FIGS. 5 and 18, the RX replacer 52 transmits the SOF and arbitration fields to RRXD which pass through RX multiplexer 53 to CRXD. The FD detection unit 51 signals the EDL bit by setting IDE-RTR and then sets FDDAMASK.

The RX replacer 52 sets RSTRSEL (FIG. 13) and starts generation of substitute bits 21. The RX replacer 52 generates IDE (in the case of a base format frame) or the reserved bit r1 (in the case of an extended format frame), the reserved bit r0 and DLC bits indicating zero length data field, then CRC, ACK, EOF and IFS data which are placed on RRXD and pass through RX multiplexer 53 to CRXD which are placed on RRXD and pass through RX multiplexer 53 to CRXD. IDE/reserved bit r0 is not shown for clarity.

The FD detection unit 51 determines that IFS has been reached and so sets ENDGEN. However, the RX replacer 52 ignores this indication because it has not completed signal generation, i.e. substitute frame generation is still on-going and overload frame generation has not yet started. The FD detection unit 51 checks whether another SOF has been received in the meantime. Since SOF has been received and GENCOMP has not been set, the FD detection unit 51 does not reset FDDAMASK.

The RX replacer 52 completes generation of substitute data 21 including EOF and IFS data. After that, the RX replacer 52 generates overload frames and overload delimiter which are placed on RRXD. At this point, the RX replacer 52 can accept ENDGEN signal, stop the overload frame generation and then respond with a GENCOMP signal.

If a new frame is received, then the FD detection unit 51 determines that IFS has been reached, and sets ENDGEN. After the RX replacer 52 has responded with GENCOMP, the FD detection unit 51 resets FDDAMASK. With deactivation of FDDAMASK, the RX replacer 52 resets RSTRSEL (FIG. 13).

Figure 19:
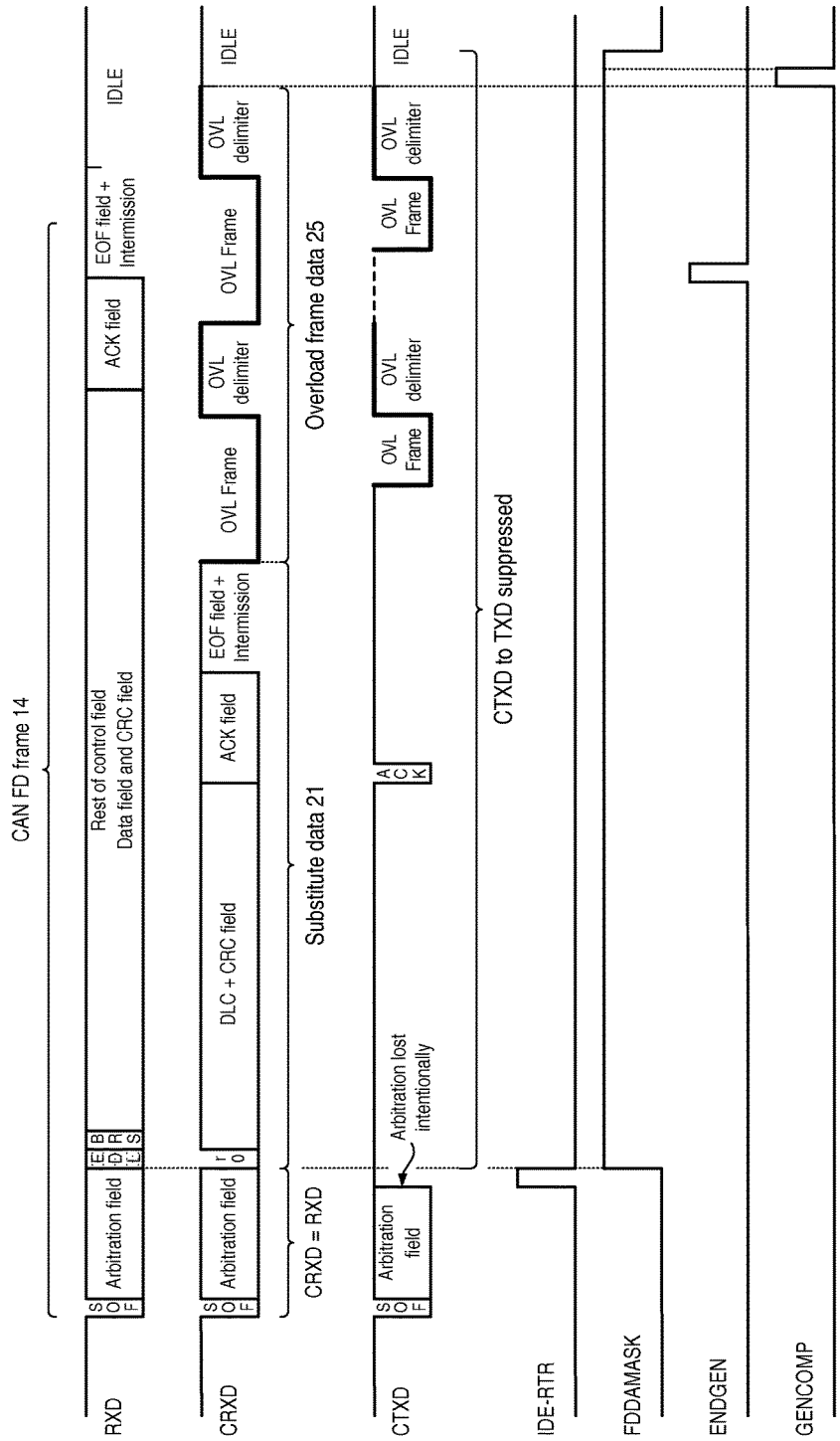
FIG. 19 is a timing diagram showing RXD, CRXD and CTXD data signals and IDE-RTR, FDDDAMASK, ENDGEN and GENCOMP control signals illustrating processing of a long CAN FD frame by a CAN FD/CAN FD passive converter operating in a second operating mode.

FIG. 19 illustrates processing of a CAN FD frame 14 by the CAN FD/CAN FD passive converter 15 (FIG. 5) operating in a second mode. The CAN FD frame 14 is long, i.e. longer than a substitute frame 22 which is used to replace it.

As shown in FIG. 19, the CAN FD frame 14 is received on RXD and includes a SOF field, an arbitration field, EDL and BRS bits, the rest of the control field, a data field and a CRC field, an ACK field and EOF field. The frame 14 is followed by IFS after which the bus becomes idle.

Referring to FIGS. 5 and 19, the RX replacer 52 transmits the SOF and arbitration fields to RRXD which pass through RX multiplexer 53 to CRXD. The FD detection unit 51 signals the EDL bit by setting IDE-RTR and then sets FDDAMASK.

The RX replacer 52 sets RSTRSEL (FIG. 13) and starts generation of substitute bits 21. The RX replacer 52 generates IDE (in the case of a base format frame) or the reserved bit r1 (in the case of an extended format frame), the reserved bit r0 and DLC bits indicating zero length data field, then CRC, ACK, EOF and IFS data and then idle which are placed on RRXD and pass through RX multiplexer 53 to CRXD which are placed on RRXD and pass through RX multiplexer 53 to CRXD. IDE/reserved bit r0 is not shown for clarity.

After that, while FDDAMASK is active and ENDGEN is inactive, the RX replacer 52 starts and continues to send overload frames to prevent the local CAN controller 6 (FIG. 3) from trying to start sending a message.

When the FD detection unit 51 recognizes IFS (i.e. that the CAN FD frame has passed), it activates ENDGEN. Substitute frame generation has already finished and overload frame generation is active. Thus, the RX replacer 52 recognizes ENDGEN after completion of generation of the current overload frame and overload delimiter. Then, to confirm completion, the RX replacer 52 sets the GENCOMP signal. Accordingly, the FD detection unit clears FDDAMASK.

In the examples shown in FIGS. 15 to 18, the CAN FD frames can be in base format or in extended format. If a CAN FD frame has a base format, then the CAN frame having a base format can replace it. Likewise, if a CAN FD frame has an extended format, then the CAN frame having an extended format can be used to replace it. If more than one CAN substitute frame is generated, then the CAN substitute frames need not be all of the same format, i.e. base or extended format.

It will be appreciated that many modifications may be made to the embodiments hereinbefore described.

For example, high-level functional blocks (such as the FD detection unit and RX replacer) may be sub-divided differently into lower-level functional blocks. Additional functional blocks may be provided.

The invention claimed is:

1. A device comprising:
   first circuitry configured to identify whether a frame on a receive data signal RXD is a controller area network Flexible Data Rate CAN FD frame; and
   second circuitry configured, in dependence upon the first circuitry identifying that the frame is a CAN FD frame, to replace a section of the CAN FD frame, which includes a data phase of the CAN FD frame, with substitute data having a format which complies with CAN 2.0B and to add additional data after the substitute data,
   wherein:
   in a first mode, the additional data comprises and error frame and an error delimiter; and
   in a second mode, the additional data comprises at least overload frame and corresponding overload delimiter.

2. A device according to claim 1, wherein the section starts with an extended data length EDL/Flexible Data Format FDF bit.

3. A device according to claim 1, wherein the section ends with the cyclical redundancy code CRC delimiter.

4. A device according to claim 1, which is configured to replace data following the section with further substitute data having a format which complies with CAN 2.0B.

5. A device according to claim 1, wherein the substitute data includes a data length code DLC.

6. A device according to claim 1, wherein, in the first mode, the device is configured to identify a point given number of bits before the end of the CAN FD frame and to add the error frame and error delimiter such that the error delimiter ends when the CAN FD frame ends.

7. A device according to claim 1, which is configured to identify whether the frame is a CAN FD frame by identifying an Extended Data Length EDL/Flexible Data Format FDF bit.

8. A device according to claim 1, which is configured to identify whether the frame has a base format or an extended format.

9. A CAN transceiver comprising:
   a device according to claim 1; and
   CAN bus physical layer device circuitry,
   wherein the device is arranged to receive the receive data signal RXD from the CAN bus physical layer device circuitry and to provide a CAN transmit data signal TXD to the CAN bus physical layer device circuitry.

10. A node comprising:
    a CAN 2.0B controller; and
    a CAN transceiver according to claim 9 coupled to the CAN 2.0B controller.

11. A device according to claim 1, wherein the first circuitry comprises:
    a first functional block configured to identify the start of a frame.

12. A device according to claim 1, wherein the device comprises:
    a functional block configured to identify an Extended Data Length EDL/Flexible Data Format FDF bit.

13. A device according to claim 1, wherein the second circuitry includes:
    a set of at least one or at least two generators for generating the substitute data.

14. A device comprising:
    first circuitry configured to identify whether a frame on a receive data signal RXD is a controller area network Flexible Data Rate CAN FD frame;
    second circuitry configured, in dependence upon the first circuitry identifying that the frame is a CAN FD frame, to replace a section of the CAN FD frame, which includes a data phase of the CAN FD frame, with substitute data having a format which complies with CAN 2.0B; and
    third circuitry configured, in response to receiving a CAN frame from a local CAN controller, to suppress transmission of the CAN frame in dependence upon whether the substitute data is being generated.

15. A method comprising:
    identifying whether a frame on a receive data signal RXD is a controller area network Flexible Data Rate CAN FD frame; and
    in dependence upon identifying that the frame is a CAN FD frame, replacing a section of the CAN FD frame including a data phase of the CAN FD frame with substitute data having a format which complies with CAN 2.0B and adding additional data after the substitute data wherein:
    in a first mode, the additional data comprises an error frame and an error delimiter; and
    in a second mode, the additional data comprises at least overload frame and corresponding overload delimiter.

* * * * *